United States Patent
Oya et al.

(10) Patent No.: US 7,435,461 B2
(45) Date of Patent: Oct. 14, 2008

(54) CELLULOSE ACYLATE FILM

(75) Inventors: Toyohisa Oya, Minamiashigara (JP); Hirohisa Hokazono, Minamiashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 661 days.

(21) Appl. No.: 11/061,553

(22) Filed: Feb. 18, 2005

(65) Prior Publication Data

US 2005/0186360 A1 Aug. 25, 2005

(30) Foreign Application Priority Data

Feb. 20, 2004 (JP) ............................. 2004-043881
Mar. 18, 2004 (JP) ............................. 2004-077429
Mar. 24, 2004 (JP) ............................. 2004-087667

(51) Int. Cl.
*C03F 19/00* (2006.01)
*C03F 19/52* (2006.01)

(52) U.S. Cl. ...................... 428/1.31; 428/1.1; 428/532; 536/56; 430/542; 430/564

(58) Field of Classification Search ................. 428/1.1, 428/1.31, 532; 536/56; 430/542, 564
See application file for complete search history.

(56) References Cited

U.S. PATENT DOCUMENTS

2007/0146887 A1* 6/2007 Ikeda et al. ................. 359/586

FOREIGN PATENT DOCUMENTS

| JP | 2001-188128 | 7/2001 |
|----|-------------|--------|
| JP | 2003-171500 | 6/2003 |
| JP | 2003-238688 | 8/2003 |

OTHER PUBLICATIONS

Saeed S. Shojaie et al., "Preparation and Characterization of Cellulose Acetate Organic/Inorganic Hybrid Films", Journal of Applied Polymer Science, 1995, vol. 58, pp. 1263-1274.

Hatsumei Kyokai Koukai Giho, (Journal of Technical Disclosure) (Technical Disclosure No. 2001-1745 published Mar. 15, 2001, Japan Institute of Invention and Innovation) (Cited in the Specification).

* cited by examiner

*Primary Examiner*—Geraldina Visconti
(74) *Attorney, Agent, or Firm*—Buchanan Ingersoll & Rooney PC

(57) ABSTRACT

A cellulose acylate film is provided that includes a cellulose acylate that satisfies the degrees of substitution below, and a hydrolysis-condensation product of a hydrolyzable and polycondensable reactive metal compound.

$$2.5 \leq A+B \leq 3.0$$

$$0 \leq A \leq 2.95$$

(In the expressions, A denotes the degree of substitution by acetyl, and B denotes the total of the degrees of substitution by acyl groups other than acetyl). There is also provided a process for producing the cellulose acylate film, the process including a step of preparing a solution that includes the cellulose acylate above, an oligomeric hydrolysis-condensation product of a hydrolyzable and polycondensable reactive metal compound, and a solvent, a step of casting the solution on a support, and a step of forming a film by removing the solvent and drying.

16 Claims, No Drawings

CELLULOSE ACYLATE FILM

BACKGROUND OF THE INVENTION

1. Field of the Invention

The present invention relates to a cellulose acylate film that is useful for application in silver halide photographic light-sensitive materials, or in a polarizing plate, a polarizing plate protective film, a retardation film, or a viewing angle widening film for liquid crystal image display equipment.

2. Description of the Related Art

Cellulose acylate is a hygroscopic polymer, and a cellulose acylate film formed therefrom has in-plane retardation (Re) and retardation in the thickness direction (Rth) that vary accompanying changes in environmental humidity. When the cellulose acylate film is incorporated into a liquid crystal display device, if there are variations in the retardation, display unevenness occurs and the performance as a liquid crystal image display device is degraded. Re and Rth are defined in, for example, 'Hatsumei Kyokai Koukai Giho' (Journal of Technical Disclosure) (Technical Disclosure No. 2001-1745, published Mar. 15, 2001, Japan Institute of Invention and Innovation). It is therefore desirable for there to be little variation in Re and Rth accompanying changes in humidity; variation in Re and Rth accompanying a change in environment between 25° C./10% RH and 25° C./80% RH is preferably in the range of 0 nm to 90 nm, more preferably 0 nm to 60 nm, and particularly preferably 0 nm to 40 nm, and in this range the display unevenness can be eliminated.

Such a change in Re and Rth accompanying a change in humidity occurs in a short time (a few hours) with the change in humidity, is reversible, and is therefore different from moisture resistance (irreversible change caused by being exposed to high humidity for a long period of time (a few weeks or longer)).

Cellulose ester films are drawn so as to exhibit in-plane retardation (Re) and retardation in the thickness direction (Rth), and are used as retardation films for liquid crystal display devices, thereby widening the viewing angle. In recent years, a vertical alignment (VA) type liquid crystal display device has been developed, and there is a demand for a retardation film having higher Re and Rth. In order to meet such a demand for the retardation film, a technique employing a film formed by casting a solution of a cellulose acylate using a mixed ester of an acetyl group and a propionyl group has been disclosed (JP-A-2001-188128 (JP-A denotes a Japanese unexamined patent application publication)). However, even for the film described in this patent publication, the change in Re and Rth accompanying a change in humidity is not fully practical, and there is a desire for a technique that can improve this aspect.

There is a known method for forming a film by a so-called organic-inorganic hybrid technique employing a cellulose acylate and a reaction product of a hydrolyzable and polycondensable reactive metal compound (for example, JP-A-2003-171500, JP-A-2003-238688, and Journal of Applied Polymer Science, Vol. 58, 1263-1274 (1995)). However, the films formed by these known techniques have the problems that, since a cellulose acylate having a low total degree of substitution is employed, the change in Re and Rth accompanying a change in humidity cannot be reduced and it is difficult to make hydrolysis of the reactive metal compound proceed sufficiently, and there has been a desire for a technique that can solve these problems.

Furthermore, in order to carry out the above-mentioned known technique, water is often used for the hydrolysis of the reactive metal compound, and when a large amount of water is added in this process, the problem of film whitening sometimes occurs during film formation. The known organic-inorganic hybrid technique for formation of a film thus has various problems in practice, and there has been a desire for a technique that can solve these problems.

On the other hand, as an organic-inorganic hybrid technique for a cellulose derivative having a more highly cross-linked structure, there are a known cellulose derivative and an organic-inorganic hybrid film employing same, the cellulose derivative being formed by modifying cellulose with both an acetyl group and a substituent containing an ethoxysilyl group (for example, Journal of Applied Polymer Science, Vol. 58, 1263-1274 (1995)). However, since these known cellulose derivative organic-inorganic hybrid films employ hydrochloric acid, which is strongly acidic, in their preparation, when they are produced industrially, a film forming device can sometimes be corroded by hydrochloric acid that is generated during drying, or the cellulose derivative might be degraded by the acid, and there has been a desire for a technique that can solve these problems.

BRIEF SUMMARY OF THE INVENTION

It is an object of the present invention to provide a substrate film for an electronic display having improved display unevenness in the environment used when it is incorporated into a liquid crystal display device.

The above-mentioned problems of the present invention are solved by the means below.

(1) A cellulose acylate film comprising a cellulose acylate that satisfies the degrees of substitution below and a hydrolysis-condensation product of a hydrolyzable and polycondensable reactive metal compound $2.5 \leq A+B \leq 3.0$ $0 \leq A \leq 2.95$ (in the expressions, A denotes the degree of substitution by acetyl, and B denotes the total of the degrees of substitution by acyl groups other than acetyl), (2) the cellulose acylate film according to (1), wherein the cellulose acylate satisfies the degrees of substitution below $2.5 \leq A+B \leq 3.0$ $0.5 \leq A \leq 2.95$, (3) the cellulose acylate film according to (1), wherein the reactive metal compound is a compound comprising an element selected from silicon, aluminum, zirconium, titanium, and germanium, (4) the cellulose acylate film according to (1) wherein in the reactive metal compound, a compound comprising silicon has a molar proportion of at least 50% and up to 100%, (5) the cellulose acylate film according to (1), wherein an aluminum chelate compound or a titanium chelate compound is used as a catalyst for hydrolysis and condensation of the reactive metal compound, (6) the cellulose acylate film according to (1), wherein the in-plane retardation (Re) and the retardation in the thickness direction (Rth) satisfy the expressions described below $Rth \geq Re$ $200 \geq Re \geq 0$ $500 \geq Rth \geq 20$, (7) the cellulose acylate film according to (1), wherein the change in Re and Rth accompanying a change in environment between 25° C./10% RH and 25° C./80% RH is 0 nm or above but no greater than 40 nm, (8) a process for producing the cellulose acylate film, the process comprising a step of preparing a solution comprising a) a cellulose acylate that satisfies the degree of substitution $1.7 \leq A+B \leq 3.0$ (in the expression, A denotes the degree of substitution by acetyl, and B denotes the total of the degrees of substitution by acyl groups other than acetyl), b) an oligomeric hydrolysis-condensation product of a hydrolyzable and polycondensable reactive metal compound, and c) a solvent, a step of casting the solution on a support, and a step of forming a film by removing the solvent and drying, (9) the process for producing the cellulose acylate film according to (8), wherein the cellulose acylate satisfies the degree of substitution below $2.5 \leq A+B \leq 3.0$

(10) the process for producing the cellulose acylate film according to either (8) or (9), wherein the oligomeric reactive metal compound is a compound comprising an element selected from silicon, aluminum, zirconium, titanium, and germanium,

(11) the process for producing the cellulose acylate film according to any one of (8) to (10), wherein in the oligomeric reactive metal compound, a compound comprising silicon has a molar proportion of at least 50% and up to 100%,

(12) the process for producing the cellulose acylate film according to any one of (8) to (11), wherein the degree of polymerization of the oligomeric reactive metal compound is 2 to 20,

(13) the process for producing the cellulose acylate film according to any one of (8) to (12), wherein the process comprising a step of promoting the hydrolysis-condensation by further hydrolysis and condensation of the oligomeric reactive metal compound,

(14) the process for producing the cellulose acylate film according to any one of (8) to (13), wherein an aluminum chelate compound or a titanium chelate compound is used as a catalyst for hydrolysis and condensation of the oligomeric reactive metal compound,

(15) the process for producing the cellulose acylate film according to any one of (8) to (14), wherein the in-plane retardation (Re) and the retardation in the thickness direction (Rth) satisfy the expressions described below $Rth \geq Re$ $200 \geq Re \geq 0$ $500 \geq Rth \geq 20$,

(16) the process for producing the cellulose acylate film according to any one of (8) to (15), wherein the change in Re and Rth accompanying a change in environment between 25° C./10% RH and 25° C./80% RH is 0 nm or above but no greater than 40 nm,

(17) a cellulose derivative dope composition comprising a) a cellulose derivative that satisfies the degrees of substitution below $2.5 \leq X+Y+Z \leq 3.0$ $0 < X+Y < 3.0$ $0 < Z < 3.0$ (in the expressions, X denotes the degree of substitution by acetyl, Y denotes the total of the degrees of substitution by acyl groups other than acetyl, and Z denotes the degree of substitution by a group represented by Formula (1) below)

$-(L^1)_m(L^2)SiR_nQ_{3-n}$ (1)

(in the formula, $L^1$ denotes a divalent connecting group that can form a bond with an oxygen atom originating from a cellulose hydroxyl group, $L^2$ denotes a divalent connecting group, R denotes an alkyl group, an aryl group, an alkenyl group, an alkynyl group, or a heterocyclic group, Q denotes a halogen atom, an alkoxy group, an aryloxy group, an alkenyloxy group, an alkynyloxy group, a heterocyclic oxy group, or an acyloxy group, m denotes 0 or 1, and n denotes 0, 1, or 2), b) a hydrolyzable and polycondensable reactive metal compound, c) a metal chelate compound and/or an organotransition metal compound for hydrolysis and polycondensation of the reactive metal compound, and d) a solvent,

(18) the cellulose derivative dope composition according to (17), wherein in Formula (1), $L^1$ is —C=O— or —C=ONH— and $L^2$ denotes a group selected from the group consisting of an alkylene group, an arylene group, —O—, —S—, —SO—, —SO$_2$—, —CO—, —NR$^1$— (R$^1$ denotes an alkyl group, an aryl group, an alkenyl group, an alkynyl group, or a heterocyclic group) and a divalent heterocyclic group, or a composite substituent of a combination of the above,

(19) the cellulose derivative dope composition according to either (17) or (18), wherein the reactive metal compound b) is a compound containing an element selected from silicon, aluminum, zirconium, titanium, and germanium,

(20) the cellulose derivative dope composition according to any one of (17) to (19), wherein among reactive metals constituting the reactive metal compound b), the molar proportion of silicon is at least 50% and up to 100%,

(21) the cellulose derivative dope composition according to any one of (17) to (20), wherein the metal chelate compound for hydrolysis and polycondensation of the reactive metal compound c) is an aluminum chelate compound and/or a titanium chelate compound,

(22) an optical film obtained by casting and drying the cellulose derivative dope composition according to any one of (17) to (21),

(23) the optical film according to (22), wherein the in-plane retardation (Re) and the retardation in the thickness direction (Rth) satisfy the expressions below $Rth \geq Re$ $200 \geq Re \geq 0$ $500 \geq Rth \geq 20$, and

(24) the optical film according to either (22) or (23), wherein the change in Re and Rth accompanying a change in environment between 25° C./10% RH and 25° C./80% RH is 0 nm or above but no greater than 40 nm.

DETAILED DESCRIPTION OF THE INVENTION

The cellulose acylate preferably used in the present invention is explained in detail. The cellulose acylate of the present invention has an acyl group having 2 to 22 carbons, the degree of substitution by the acyl group satisfying the expressions below.

$2.5 \leq A+B \leq 3.0$ $0 \leq A \leq 2.95$

Here, A denotes the degree of substitution by acetyl, and B denotes the sum total of the degrees of substitution by acyl groups other than acetyl. The sum total of the degrees of acyl substitution is at least 2.5 but no greater than 3.0, and the degree of acetyl substitution is 0 or more but no greater than 2.95. It is undesirable if A+B is less than 2.5 since the cellulose acylate becomes hydrophilic and there is a large change in retardation under high humidity conditions.

β-1,4 Bonded glucose units that constitute cellulose have free hydroxyl groups at the 2-, 3-, and 6-positions. The cellulose acylate is a polymer formed by esterifying part or all of these hydroxyl groups. The degree of acyl substitution means the total of the proportions esterified at each of the 2-, 3-, and 6-positions of the cellulose (100% esterification is a degree of substitution of 1). In the present invention, the sum total of the degrees of acyl substitution is preferably at least 2.65 but not greater than 2.96, and particularly preferably at least 2.75 but not greater than 2.95.

In the present invention, the degree of substitution of the hydroxyl group at each of the 2-, 3-, and 6-positions of cellulose is not particularly limited, but in the case of cellulose acetate, the solubility of the cellulose acylate can be improved by the use of a cellulose acetate having a degree of substitution at the 6-position of preferably at least 0.8, more preferably at least 0.85, and particularly preferably at least 0.90 and, in particular, a good solution can be prepared with a non-chlorinated organic solvent.

The acyl group of the cellulose acylate of the present invention may be either an aliphatic acyl group or an aromatic acyl group. When the acyl group of the cellulose acylate of the present invention is an aliphatic acyl group, it preferably has 2 to 22 carbons, more preferably 2 to 8 carbons, and particularly preferably 2 to 4 carbons. Examples of the aliphatic acyl group include alkylcarbonyl, alkenylcarbonyl, and alkynylcarbonyl. When the acyl group is an aromatic acyl group, it preferably has 6 to 22 carbons, more preferably 6 to 18 carbons, and particularly preferably 6 to 12 carbons. The aliphatic acyl group and the aromatic acyl group may further have a substituent.

Preferred examples of the acyl group include acetyl, propionyl, butyryl, heptanoyl, hexanoyl, octanoyl, decanoyl, dodecanoyl, tridecanoyl, tetradecanoyl, hexadecanoyl, octadecanoyl, isobutyryl, pivaloyl, cyclohexanecarbonyl, oleoyl, benzoyl, naphthalenecarbonyl, phthaloyl, and cinnamoyl. Among these examples, acetyl, propionyl, butyryl, dodecanoyl, octadecanoyl, pivaloyl, oleoyl, benzoyl, naphthalenecarbonyl, cinnamoyl, etc. are more preferable, and acetyl, propionyl, and butyryl are particularly preferable.

With regard to substituents allowed on the aliphatic acyl group or the aromatic acyl group, there can be cited as examples the atoms and the atomic groups below. That is, examples of the substituent include a halogen atom (a fluorine atom, a chlorine atom, a bromine atom, or an iodine atom), an alkyl group (straight-chain, branched, or cyclic alkyl group, including a bicycloalkyl group and an active methine group), an alkenyl group, an alkynyl group, an aryl group, a heterocyclic group (no limitation on the substituent position), an acyl group, an alkoxycarbonyl group, an aryloxycarbonyl group, a heterocyclic oxycarbonyl group, a carbamoyl group, an N-acylcarbamoyl group, an N-sulfonylcarbamoyl group, an N-carbamoylcarbamoyl group, an N-sulfamoylcarbamoyl group, a carbazoyl group, a carboxy group or a salt thereof, an oxalyl group, an oxamoyl group, a cyano group, a carbonimidoyl group, a formyl group, a hydroxyl group, an alkoxy group (including a group containing repeating ethyleneoxy group units or propyleneoxy group units), an aryloxy group, a heterocyclic oxy group, an acyloxy group, an (alkoxy or aryloxy)carbonyloxy group, a carbamoyloxy group, a sulfonyloxy group, an amino group, an (alkyl, aryl, or heterocyclic) amino group, an acylamino group, a sulfonamido group, a ureido group, a thioureido group, an imide group, an (alkoxy or aryloxy)carbonylamino group, a sulfamoylamino group, a semicarbazide group, an ammonio group, an oxamoylamino group, an N-(alkyl or aryl)sulfonylureido group, an N-acylureido group, an N-acylsulfamoylamino group, a quaternary nitrogen atom-containing heterocyclic group (e.g., a pyridinio group, an imidazolio group, a quinolinio group, an isoquinolinio group), an isocyano group, an imino group, an (alkyl or aryl)sulfonyl group, an (alkyl or aryl)sulfinyl group, a sulfo group or a salt thereof, a sulfamoyl group, an N-acylsulfamoyl group, an N-sulfonylsulfamoyl group or a salt thereof, a phosphino group, a phosphinyl group, a phosphinyloxy group, a phosphinylamino group, and a silyl group. These groups may further be combined to form a composite substituent, and examples of such a substituent include an ethoxyethoxyethyl group, a hydroxyethoxyethyl group, and an ethoxycarbonylethyl group.

The cellulose acylate of the present invention is preferably a mixed ester having two or more types of acyl groups, and specific examples thereof include cellulose acetate propionate, cellulose acetate butyrate, cellulose propanoate butyrate, cellulose acetate propionate butyrate, cellulose acetate hexanoate, cellulose acetate octanoate, cellulose acetate cyclohexanoate, cellulose acetate decanoate, cellulose acetate adamantanecarboxyate, cellulose acetate carbamate, and cellulose acetate phthalate. More preferred examples thereof include cellulose acetate propionate, cellulose acetate butyrate, cellulose propanoate butyrate, cellulose acetate hexanoate, and cellulose acetate octanoate. Particularly preferred examples thereof include cellulose acetate propionate and cellulose acetate butyrate.

When the cellulose acylate of the present invention is a mixed ester having two or more types of acyl groups, the degree of substitution by the acyl group preferably satisfies the following expressions.

$$2.5 \leq A+B \leq 3.0$$

$$0 \leq A \leq 2.95$$

Here, A denotes the degree of substitution by acetyl, and B denotes the sum total of the degrees of substitution by acyl groups other than acetyl. The degree of substitution by acetyl is more preferably $0.5 \leq A \leq 2.95$. The sum total of the degrees of acyl substitution is more preferably at least 2.65 but no greater than 2.96, and particularly preferably at least 2.75 but no greater than 2.95.

In the present invention, two or more different types of cellulose acylates may be mixed and used in the same layer, or a film may be formed with different layers.

A synthetic method for a cellulose acylate is described in N. Uda, et al., 'Mokuzai Kagaku' (Wood Chemistry) pp. 180 to 190 (Kyoritsu Shuppan Co., Ltd., 1968), etc. A representative synthetic method is a liquid-phase acylation method with a carboxylic acid anhydride/acetic acid/sulfuric acid catalyst. Specifically, it is a method in which a cellulose acylate is synthesized by pretreating a cellulose starting material such as cotton linter or wood pulp with an appropriate amount of a carboxylic acid (which may contain water, sulfuric acid, etc. if necessary), and then adding an acylating agent mixture thereto so as to carry out esterification. The acylating agent mixture generally contains acetic acid or a carboxylic acid as a solvent, a carboxylic acid anhydride as an esterifying agent, and a proton acid or Lewis acid catalyst (sulfuric acid, perchloric acid, phosphoric acid, zinc chloride, sulfuryl chloride, etc.). The carboxylic acid anhydride is preferably used in a stoichiometric excess relative to the total of the cellulose that is to be reacted therewith and moisture that is present in the system. The amount of catalyst is preferably 0.5 to 25 parts by weight relative to 100 parts by weight of the cellulose.

The reaction temperature can be selected freely according to the target characteristics of a cellulose acylate, and is preferably −30° C. to 70° C., more preferably −20° C. to 60° C., and particularly preferably −10° C. to 50° C. The reaction temperature may be changed according to the stage of the reaction. The reaction temperature may be adjusted by controlling the temperature of the acylating agent mixture or the temperature of a reactor.

The total degree of acyl substitution at the 2-, 3-, and 6-positions when the reaction is completed is preferably about 3.00, which is a high degree of substitution, and a cellulose acylate having a degree of substitution that is lower than the above can be obtained via an aging step described later.

After completion of the acylation reaction, in order to hydrolyze excess carboxylic acid anhydride that remains and neutralize part or all of the esterification catalyst, water or a neutralizing agent (for example, a carbonate, a carboxylate (acetate, propionate, phthalate, etc.), a hydroxide, or an oxide of sodium, potassium, calcium, magnesium, iron, aluminum, zinc, etc.), or a solution thereof may be added.

The cellulose acylate thus obtained is preferably maintained at −10° C. to 90° C. in the presence of a small amount of acid catalyst (generally, an acid catalyst such as remaining sulfuric acid or perchloric acid) so as to carry out hydrolysis (saponification) of ester bonding and depolymerization of ether bonding, thus carrying out hydrolysis until a cellulose acylate having a desired degree of acyl substitution and degree of polymerization is obtained (the so-called aging). When a desired cellulose acylate is obtained, the remaining catalyst is neutralized completely or partially with the above-mentioned neutralizing agent, or the cellulose acylate solution mixture is poured into water or an appropriate organic solvent without neutralizing (or water or an appropriate organic solvent is poured into the cellulose acylate solution) so as to precipitate the cellulose acylate, which is then washed to give the cellulose acylate.

In order to decompose a cellulose sulfate ester by-product or neutralize the remaining acid, it is preferable to carry out a treatment with an aqueous solution of a stabilizing agent (for example, a carbonate, an acetate, a hydroxide, or an oxide of sodium, potassium, calcium, magnesium, iron, aluminum, zinc, etc.).

Synthesis of a cellulose acylate having a high degree of substitution at the 6-position is described in JP-A-11-5851, JP-A-2002-212338, JP-A-2002-338601, etc.

With regard to other synthetic methods for a cellulose acylate that can be used here, there is a method in which cellulose is reacted with a carboxylic acid halide in the presence of a base (sodium hydroxide, potassium hydroxide, barium hydroxide, sodium carbonate, pyridine, triethylamine, potassium t-butoxide, sodium methoxide, sodium ethoxide, etc.) and a method in which a mixed acid anhydride (a carboxylic acid/trifluoroacetic acid mixed anhydride, a carboxylic acid/methanesulfonic acid mixed anhydride, etc.) is used as an acylating agent and, in particular, the latter method is effective when incorporating an acyl group having a large number of carbons or an acyl group that is difficult to subject to the liquid-phase acylation method with a carboxylic acid anhydride/acetic acid/sulfuric acid catalyst.

With regard to a method for obtaining a mixed cellulose acylate, there are a method in which a reaction is carried out by mixing or successively adding, as acylating agents, two types of carboxylic acid anhydrides, a method in which a mixed acid anhydride of two types of carboxylic acids (for example, an acetic acid/propionic acid mixed acid anhydride) is used, a method in which a mixed acid anhydride (e.g., acetic acid/propionic acid mixed acid anhydride) is synthesized in a reaction system using a carboxylic acid and an acid anhydride of another carboxylic acid (e.g., acetic acid and propionic acid anhydride) as starting materials and then reacted with cellulose, and a method in which cellulose acylate having a degree of substitution of less than 3 is first synthesized and the remaining hydroxyl groups are then acylated using an acid anhydride or an acid halide, etc.

It is useful to remove low molecular weight components from the cellulose acylate since, although the average molecular weight (degree of polymerization) increases, the viscosity becomes lower than that of a standard cellulose acylate. A cellulose acylate containing a low level of low molecular weight components can be obtained by removing low molecular weight components from a cellulose acylate synthesized by a standard method. Removal of low molecular weight components can be carried out by washing the cellulose acylate with an appropriate organic solvent. When a cellulose acylate containing a low level of low molecular weight components is produced using a sulfuric acid catalyst, it is preferable to adjust the amount of sulfuric acid catalyst in the acylation reaction so that it is 0.5 to 25 parts by weight relative to 100 parts by weight of the cellulose. Use of a sulfuric acid catalyst in an amount in the above-mentioned range enables a cellulose acylate having a preferred molecular weight distribution (uniform molecular weight distribution) to be synthesized.

Cotton starting materials and synthetic methods for these cellulose acylates used in the present invention are described in detail in, for example, 'Hatsumei Kyokai Koukai Giho' (Journal of Technical Disclosure) (Technical Disclosure No. 2001-1745, published Mar. 15, 2001, Japan Institute of Invention and Innovation), pp. 7 to 12.

The degree of polymerization of the cellulose acylate preferably used in the present invention is, as an average degree of polymerization, 150 to 700, preferably 180 to 550, more preferably 200 to 400, and particularly preferably 200 to 350. The average degree of polymerization can be measured by the limiting viscosity method of Uda, et al., (K. Uda and H. Saito, 'Sen-i Gakkaishi' (Journal of the Society of Fiber Science and Technology, Japan), Vol. 18, No. 1, pp. 105 to 120, 1962), a method involving measurement of the molecular weight distribution by gel permeation chromatography (GPC), etc. A detailed description can also be found in JP-A-9-95538.

The cellulose acylate used in the production of a cellulose acylate film of the present invention preferably has a water content of 2 wt % or less, more preferably 1 wt % or less, and particularly preferably 0.7 wt % or less. It is known that a cellulose acylate generally contains water and its equilibrium water content is 2.5 to 5 wt %. In the present invention, in order to adjust the water content of the cellulose acylate to a preferred level, it is preferable to dry the cellulose acylate. The drying method is not particularly limited as long as a target water content can be obtained.

The cellulose acylate film of the present invention is preferably formed from a cellulose acylate having polymer components that substantially satisfy the above-mentioned definitions. 'Substantially' here means at least 55 wt % of the polymer components (preferably at least 70 wt %, and more preferably at least 80 wt %). With regard to a starting material for production of the film, the cellulose acylate is preferably in the form of particles or a powder. When the cellulose acylate is in the form of particles, it is preferable that at least 90 wt % of the particles used have a particle size of 0.5 to 5 mm. It is also preferable that at least 50 wt % of the particles used have a particle size of 1 to 4 mm. The cellulose acylate particles preferably have a shape that is as close to spherical as possible.

Hydrolysis-Condensation Product of Hydrolyzable and Polycondensable Reactive Metal Compound The hydrolysis-condensation product of a hydrolyzable and polycondensable reactive metal compound is now explained in detail. It is surmised that in the cellulose acylate film of the present invention the hydrolysis-condensation product has the function of reducing the humidity dependence of retardation as a result of a condensate or a partial condensate obtained by hydrolysis and condensation forming a structure in the film or functioning as a binder so as to suppress the expansion of the film by moisture. When the cellulose acylate contains an unacylated hydroxyl group, a bond may be formed between the hydroxyl group and the reactive metal compound. The metal referred to in the present invention denotes one described as a metal in K. Saito, 'Shukihyouno Kagaku' (Chemistry of the Periodic Table), published by Iwanami Shoten, p. 71, that is, an element such as a metalloid atom.

The hydrolysis-condensation product includes not only a condensate or a partial condensate obtained by condensation of a reactive metal compound but also a condensate or a partial condensate obtained by condensation of an oligomeric hydrolysis-condensation product of a reactive metal compound. In the cellulose acylate film of the present invention, a reactive metal compound and an oligomeric hydrolysis-condensation product of a reactive metal compound may be used in combination.

Examples of the hydrolyzable and polycondensable reactive metal compound used in the present invention include a metal alkoxide, a metal halide, and a metal acyloxide, and these metals may have in addition to a reactive substituent a hydrocarbon group (e.g., an alkyl, aryl, alkenyl, alkynyl, heterocyclic group, etc.).

Preferred metal species are selected from silicon, aluminum, zirconium, titanium, and germanium; silicon, aluminum, zirconium, and titanium are more preferable, and silicon is particularly preferable. The film of the present invention may contain a plurality of metal species, and it is preferable for the molar proportion of a silicon-containing compound to be at least 50% and up to 100%, more preferably at least 70% and up to 100%, and particularly preferably at least 90% and up to 100%.

Examples of a compound, used in the present invention, that is a hydrolyzable-polycondensable reactive metal compound and has two hydrolyzable substituents per metal atom include dimethyldimethoxysilane, dimethyldiethoxysilane, dimethyldiisopropoxysilane, dimethyidibutoxysilane, diethyldimethoxysilane, diethyldiethoxysilane, diethyldiisopropoxysilane, diethyldibutoxysilane, diphenyldimethoxysilane, diphenyldiethoxysilane, diphenyldiisopropoxysilane, diphenyldibutoxysilane, 3-glycidoxypropylmethyldimethoxysilane, dichlorodimethylsilane, dichlorodiethylsilane, dimethyldiacetoxysilane, diethyldiacetoxysilane, diphenyldiacetoxysilane, barium isopropoxide, calcium ethoxide, copper ethoxide, magnesium ethoxide, manganese methoxide, strontium isopropoxide, tin ethoxide, and zinc methoxyethoxide.

Examples of a compound having three hydrolyzable substituents per metal atom include methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, phenyltrimethoxysilane, phenyltriethoxysilane, phenyltriisopropoxysilane, phenyltributoxysilane, methyltriacetoxysilane, ethyltriacetoxysilane, phenyltriacetoxysilane, vinyltrimethoxysilane, vinyltriethoxysilane, vinyltriisopropoxysilane, vinyltributoxysilane, 3-glycidoxypropyltrimethoxysilane, 3-aminopropyltriethoxysilane, 2-(3,4-epoxycyclohexyl)ethyltrimethoxysilane, 3-chloropropyltrimethoxysilane, 3-mercaptopropyltrimethoxysilane, (3-acryloxypropyl)trimethoxysilane, acetoxytriethoxysilane, (heptadecafluoro-1,1,2,2-tetrahydrodecyl)trimethoxysilane, (3,3,3-trifluoropropyl)trimethoxysilane, methyltrichlorosilane, ethyltrichlorosilane, phenyltrichlorosilane, trimethoxyborane, triethoxyborane, aluminum ethoxide, aluminum isopropoxide, aluminum n-butoxide, aluminum s-butoxide, aluminum t-butoxide, alumatrane, aluminum phenoxide, aluminum acetylacetonate, antimony ethoxide, arsenic triethoxide, bismuth t-pentoxide, chromium isopropoxide, erbium methoxyethoxide, gallium ethoxide, indium methoxyethoxide, iron ethoxide, lanthanum isopropoxide, neodymium methoxyethoxide, praseodymium methoxyethoxide, samarium isopropoxide, vanadium triisobutoxide oxide, and yttrium isopropoxide.

Examples of a compound having four hydrolyzable substituents per metal atom include tetramethoxysilane, tetraethoxysilane, tetraisopropoxysilane, tetrabutoxysilane, tetraacetoxysilane, tetrapropionyloxysilane, titanium ethoxide, titanium isopropoxide, titanium n-butoxide, zirconium n-propoxide, zirconium n-butoxide, tetramethoxygermane, tetraethoxygermane, tetraisopropoxygermane, tetra-n-butoxygermane, cerium t-butoxide, hafnium ethoxide, hafnium n-butoxide, and tellurium ethoxide.

Examples of a compound having five hydrolyzable substituents per metal atom include molybdenum ethoxide, niobium ethoxide, niobium n-butoxide, tantalum methoxide, tantalum ethoxide, tantalum n-butoxide, tungsten ethoxide, and tungsten phenoxide.

In the present invention, it is preferable to use a compound having at least two but no greater than five hydrolyzable substituents per metal atom.

With regard to the reactive metal compound of the present invention, it is preferable to use a metal compound that has no absorption in the visible region of 400 nm and above when it becomes the metal oxide, and more preferably a compound of silicon, aluminum, zirconium, or titanium, or a multinuclear compound of these metals may be used.

The multinuclear compound referred to here means a compound containing a plurality of metal atoms in one molecule, and examples thereof include aluminum copper alkoxide, aluminum titanium alkoxide, aluminum yttrium alkoxide, aluminum zirconium alkoxide, barium titanium alkoxide, barium zirconium alkoxide, indium tin alkoxide, magnesium aluminum alkoxide, magnesium titanium alkoxide, magnesium zirconium alkoxide, strontium titanium alkoxide, and strontium zirconium alkoxide.

In the present invention, the reactive metal compound is particularly preferably a silicon compound.

In general, a compound represented by the formula $(R)_4Si$ is preferably used. In the formula, R denotes a hydrocarbon group (e.g., an alkyl group, an alkenyl group, an alkynyl group, or an aryl group, and these groups may have a substituent), an alkoxyl group, an oxyacyl group, or a halogen atom. The four Rs in a molecule may be identical to each other or different from each other and can be selected freely in any combination as long as they satisfy the definition above, but at least one R among the four Rs denotes an alkoxyl group, an oxyacyl group, or a halogen atom. It is preferable that no more than two hydrocarbon groups are present simultaneously in one molecule.

Among these silicon compounds, alkoxysilanes are particularly preferably used. Examples thereof include an alkoxy silane represented by the formula $Si(OR^1)_x(R^2)_{4-x}$. Here, x denotes 2, 3, or 4, and preferably 3 or 4.

$R^1$ of such an alkoxysilane is preferably an alkyl group having 1 to 5 carbons or an acyl group having 1 to 4 carbons, and examples thereof include methyl, ethyl, n-propyl, i-propyl, n-butyl, sec-butyl, tert-butyl, and acetyl. $R^2$ is preferably an organic group having 1 to 10 carbons, and examples thereof include unsubstituted hydrocarbon groups such as methyl, ethyl, n-propyl, i-propyl, n-butyl, tert-butyl, n-hexyl, cyclohexyl, n-octyl, tert-octyl, n-decyl, phenyl, vinyl, and allyl, and substituted hydrocarbon groups such as a γ-chloropropyl group, $CF_3CH_2-$, $CF_3CH_2CH_2-$, $C_3F_7CH_2CH_2CH_2-$, $H(CF_2)_4CH_2OCH_2CH_2CH_2-$, a γ-glycidoxypropyl group, a γ-mercaptopropyl group, a 3,4-epoxycyclohexylethyl group, and a γ-methacryloyloxypropyl group.

Specific examples of these alkoxysilanes are shown below.

Examples of ones having x=4 (hereinafter, called 4-functional organosilanes) include tetramethoxysilane, tetraethoxysilane, tetra-n-propoxysilane, tetra-i-propoxysilane, tetra-n-butoxysilane, and tetraacetoxysilane.

Examples of ones having x=3 (hereinafter, called 3-functional organosilanes) include methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, γ-glycidoxypropyltrimethoxysilane, γ-glycidoxypropyltriethoxysilane, γ-methacryloyloxypropyltrimethoxysilane, γ-mercaptopropyltriethoxysilane, phenyltrimethoxysilane, vinyltriethoxysilane, 3,4-epoxycyclohexylethyltrimethoxysilane, 3,4-epoxycyclohexylethyltriethoxysilane, $CF_3CH_2CH_2Si(OCH_3)_3$, $C_2F_5CH_2CH_2Si(OCH_3)_3$, $C_2F_5OCH_2CH_2CH_2Si(OCH_3)_3$, $C_3F_7OCH_2CH_2CH_2Si(OC_2H_5)_3$, $(CF_3)_2CHOCH_2CH_2CH_2Si(OCH_3)_3$, $C_4F_9CH_2OCH_2CH_2CH_2Si(OCH_3)_3$, $H(CF_2)_4CH_2OCH_2CH_2CH_2Si(OCH_3)_3$, and 3-(perfluorocyclohexyloxy)propyltrimethoxysilane.

Examples of ones having x=2 (hereinafter, called 2-functional organosilanes) include dimethyldimethoxysilane, dimethyldiethoxysilane, methylphenyldimethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, diphenyldimethoxysilane, divinyldiethoxysilane, $(CF_3CH_2CH_2)_2Si(OCH_3)_2$, $(C_3F_7OCH_2CH_2CH_2)_2Si(OCH_3)_2$, $[H(CF_2)_6CH_2OCH_2CH_2CH_2]_2Si(OCH_3)_2$, and $(C_2F_5CH_2CH_2)_2Si(OCH_3)_2$.

The reactive metal compound is preferably used at 5 to 50 parts by weight relative to 100 parts by weight of the cellulose acylate solids content, more preferably 10 to 40 parts by weight, and particularly preferably 15 to 35 parts by weight.

The above-mentioned organosilane may be used singly or in a combination of two or more types. In the latter case, the total amount of organosilanes is defined as the amount used.

Oligomeric Hydrolysis-Condensation Product of Hydrolyzable and Polycondensable Reactive Metal Compound An oligomeric hydrolysis-condensation product of a hydrolyzable and polycondensable reactive metal compound (hereinafter, also called an 'oligomeric reactive metal compound') is now explained in detail.

In the present invention, a solution containing a cellulose acylate and a solvent (hereinafter, also called a 'dope') is prepared using a reactive metal compound and/or an oligomer obtained by partial hydrolysis-polycondensation of a reactive metal compound.

The definition of the oligomer referred to here is as described in 'Rikagaku Jiten' (Dictionary of Physics and Chemistry), published by Iwanami Shoten, Fifth edition, p. 160, 1998. That is, it is a low polymer in which the number of repeating structural units (degree of polymerization) is 2 to about 20.

When a cellulose acylate film is produced using a solution containing an oligomeric hydrolysis-condensation product of a hydrolyzable and polycondensable reactive metal compound, the cellulose acylate of the present invention may be a cellulose acylate whose degree of substitution by acyl groups satisfies the expression below.

$$1.7 \leq A+B \leq 3.0$$

Here, A denotes the degree of substitution by acetyl, and B denotes the sum total of the degrees of substitution by acyl groups other than acetyl. It is undesirable if A+B is less than 1.7 since the ease of film formation of the cellulose acylate is degraded.

Furthermore, in the above-mentioned case, in the present invention it is preferable for the sum total of the degrees of acyl substitution to be at least 2.5 but not greater than 3.0, more preferably at least 2.5 but not greater than 2.96, and particularly preferably at least 2.75 but not greater than 2.95.

It is preferable for the degree of substitution (A) by acetyl to be $0.5 \leq A \leq 2.95$.

With regard to the oligomeric hydrolysis-condensation product, it is surmised that in the cellulose acylate film of the present invention, a condensate or a partial condensate obtained by further hydrolysis and condensation of the oligomer forms a structure or functions as a binder in the film, thus suppressing expansion of the film by moisture, and thereby reducing the humidity dependence of the retardation.

The hydrolysis of the reactive metal compound often requires water, but if a large amount of water is added, the dope composition obtained becomes unstable, and there are the problems that phase separation might be occured, cellulose acylate might be precipitated, and the film thus formed might be cloudy. Because of this, the amount of water added is preferably as small as possible as long as its function can be exhibited without being reduced. Moreover, since the reactive metal compound often functions as a poor solvent for the cellulose acylate, thus reducing the solubility, if a reactive metal atom is introduced, the amount of reactive metal compound added is preferably as small as possible.

Compared with a conventional technique employing a reactive metal compound, which is a monomer, the present invention employs an oligomer obtained by partial hydrolysis-polycondensation of a reactive metal compound, thus enabling the amount of water, which tends to affect preparation of a dope and formation of a film, to be reduced, the weight of the reactive metal compound per reactive metal to be decreased, and the subsequent hydrolysis-polycondensation to be accelerated.

For example, when tetramethoxysilane, which is not an oligomer but is used in the present invention, is hydrolyzed, 4 moles of water per mole of tetramethoxysilane is theoretically required on a silicon atom basis. In contrast, in order to hydrolyze an alkoxy group of hexamethoxydisiloxane, which is an oligomer used in the present invention, 6 moles of water is theoretically required per mole of hexamethoxydisiloxane, which is equivalent to 3 moles of water on a silicon atom basis. Furthermore, the ratio by weight of the amount of hexamethoxydisiloxane to the amount of tetramethoxysilane that is necessary to introduce a given number of silicon atoms is 242:304, and use of the oligomer enables the amount added to be reduced.

In this way, in accordance with the technique of the present invention, the amount of water added per reactive metal atom can be reduced, the weight of reactive metal compound per reactive metal can be decreased, and when an organic-inorganic hybrid film having a given content of a reactive metal atom is prepared, the various problems of dope preparation and film formation can be solved advantageously.

When the cellulose acylate contains an unacylated hydroxyl group, it may be bonded to a reactive metal compound.

Examples of the hydrolyzable and polycondensable oligomeric reactive metal compound used in the present invention include hydrolysis-condensation products of a metal alkoxide, a metal halide, and a metal acyloxide, and these metals may contain, in addition to a reactive substituent, a hydrocarbon group (e.g., an alkyl, aryl, alkenyl, alkynyl, heterocyclic group, etc.)

In the present invention, the degree of polymerization of the oligomer is preferably 2 to 20, more preferably 2 to 10, and particularly preferably 3 to 8.

A preferred metal species is one selected from the group consisting of silicon, aluminum, zirconium, titanium, and germanium, and is more preferably silicon, aluminum, zirconium, or titanium, and particularly preferably silicon. The oligomeric reactive metal compound of the present invention may contain a plurality of metal species, but among the metals in the oligomer, it is preferable that the molar proportion of silicon is at least 50% and up to 100%, more preferably at least 70% and up to 100%, and particularly preferably at least 90% and up to 100%.

The oligomeric reactive metal compound of the present invention may be synthesized by any known method using the above-mentioned reactive metal compound, but in order to accelerate the hydrolysis-partial condensation reaction, various types of catalytic compound may preferably be used. The catalyst that can be used is not particularly limited, and an appropriate amount thereof may be used according to the components. Compounds listed in groups (b1) to (b5) below are generally known to be effective. Furthermore, two or more types from these groups may be used in an appropriate combination in a range in which they do not interfere with each other's promotion effect.

Preferred examples of the oligomeric reactive metal compound of the present invention are listed below, but the present invention is not limited thereto.

Hexamethoxydisiloxane, 1,3-dimethyl-1,1,3,3-tetramethoxydisiloxane, 1,1,3,3-tetramethyl-1,3-dimethoxysiloxane, hexaethoxydisiloxane, 1,3-dimethyl-1,1,3,3-tetraethoxydisiloxane, 1,3-diethoxy-1,1,3,3-tetramethylsiloxane, 1,3-bis(3-hydroxypropyl)-1,1,3,3-tetramethylsiloxane, 1,1,3,3,5,5-hexamethyl-1,5-dimethoxytrisiloxane, 1,1,3,3,5,5-hexamethyl-1,5-dihydroxysiloxane, hexamethylcyclotrisiloxane, hexaethylcyclotrisiloxane, hexamethoxycyclotrisiloxane, 3-ethoxyheptamethyltrisiloxane, octamethoxycyclotetrasiloxane, octaethoxycyclotetrasiloxane, 1,3,5,7-tetramethyl-1,1,3,5,7,7-hexamethoxytetrasiloxane, 1,1,1,3,3,5,5,5-octamethoxytrisiloxane, 1,1,1,3,3,5,5,7,7,7-decamethoxytetrasiloxane, 1,1,1,3,3,5,5,7,7,9,9,9-dodecamethoxypentasiloxane, 1,1,1,3,3,5,5,5-octaethoxytrisiloxane, 1,1,1,3,3,5,5,7,7,7-decaethoxytetrasiloxane, 1,1,1,3,3,5,5,7,7,9,9,9-dodecaethoxypentasiloxane, 1,3,5,7-tetramethoxy-1,3,5,7-tetramethylcyclotetrasiloxane, 1,3,5,7-tetraethoxy-1,3,5,7-tetramethylcyclotetrasiloxane, 1,3,5,7-tetramethyl-1,3,5,7-tetrapropoxycyclotetrasiloxane, 1,3,5,7-tetraisopropoxy-1,3,5,7-tetramethylcyclotetrasiloxane, 1,3,5,7-tetrabutoxy-1,3,5,7-tetramethylcyclotetrasiloxane, 1,3,5,7,9-pentaethoxy-1,3,5,7,9-pentamethylcyclotetrasiloxane, 1,1,1,3,3,5,5,7,7,9,9,11,11,11-tetradecamethoxyhexasiloxane, 1,1,1,3,3,5,5,7,7,9,9,11,11,11-tetradecaethoxyhexasiloxane, 1,1,1,3,3,5,5,7,7,9,9,11,11,13,13,13-hexadecamethoxyheptasiloxane, 1,1,1,3,3,5,5,7,7,9,9,11,11,13,13,13-hexadecaethoxyheptasiloxane, 1,1,1,3,3,5,5,7,7,9,9,11,11,13,13,15,15,15-octadecamethoxyoctasiloxane, 1,1,1,3,3,5,5,7,7,9,9,11,11,13,13,15,15,15-octadecaethoxyoctasiloxane, methylmethoxypolysiloxane (average degree of polymerization 4-20), methylethoxypolysiloxane (average degree of polymerization 4-20), phenylmethoxypolysiloxane (average degree of polymerization 2-20), phenylethoxypolysiloxane (average degree of polymerization 2-20), hexylmethoxypolysiloxane (average degree of polymerization 2-20), hexylethoxypolysiloxane (average degree of polymerization 2-20), polymethoxysiloxane (average degree of polymerization 4-20), polyethoxysiloxane (average degree of polymerization 4-20), and polymethoxyethoxysiloxane (average degree of polymerization 4-20).

The above-mentioned oligomers may be used singly or in a combination of two or more types. They may also be used in a combination with a reactive metal compound (monomer).

It is preferable to use the oligomeric hydrolysis-condensation product of the reactive metal compound at 1 to 70 parts by weight relative to 100 parts by weight of the cellulose acylate solids content, more preferably 5 to 50 parts by weight, and particularly preferably 1 0 to 45 parts by weight.

The above-mentioned oligomers may be used singly or in a combination of two or more types. In the latter case, the total amount of oligomers is defined as the amount used.

In order to prepare the cellulose acylate film of the present invention, it is essential for the cellulose acylate and an inorganic macromolecule to be present at the same time, and a film is prepared by the so-called organic-inorganic polymer hybrid method or the method called the organic-inorganic polymer composite or sol/gel method.

That is, in order to subject a solution of the cellulose acylate and the hydrolyzable-polycondensable reactive metal compound and/or the oligomeric reactive metal compound of the present invention to hydrolysis-polycondensation by the sol/gel method, water, a catalyst, and another additive are added as necessary, thus carrying out hydrolysis and condensation reactions.

This composition is extruded or cast on a substrate so as to form a coating, dried, then subjected, as necessary, to a thermal treatment, an ultraviolet treatment, or a plasma treatment, etc., thus giving a cellulose acylate film in which hydrolysis and condensation of the reactive metal compound have taken place.

The cellulose acylate film of the present invention may be drawn. With regard to a tenter drying device, either a pin tenter method or a clip tenter method may be used, and with regard to a cellulose acylate film for a liquid crystal display device, drawing is preferably carried out laterally by on the order of 0.5% to 5% using a tenter drying device. After carrying out drying, drawing may be carried out at a temperature of the Tg or higher than the Tg. The hydrolysis and condensation reactions of the present invention may be carried out in one step or multiple steps at any timing after preparing a dope and before completion of drying of a film, and it is particularly preferable that a condensation reaction is carried out utilizing heat when the film is in a drying step. Moreover, the film may be subjected to annealing by post heating.

Catalyst Compounds

In the present invention, for the purpose of promoting the hydrolysis-partial condensation reaction of a reactive metal compound and/or an oligomeric reactive metal compound, various types of catalyst compound can preferably be used. The catalyst that is used is not particularly limited, and an appropriate amount thereof may be used according to the components.

Compounds of groups (b1) to (b5) below are generally effective, and a preferred compound from these compounds may be added in a necessary amount. It is also possible to select two or more types of compounds of these groups in a range in which they do not interfere with each other's promotion effect.

(b1) Organic or Inorganic Acids

Examples of inorganic acids include hydrochloric acid, hydrogen bromide, hydrogen iodide, sulfuric acid, sulfurous acid, nitric acid, nitrous acid, phosphoric acid, and phosphorous acid, and examples of organic acid compounds include carboxylic acids (formic acid, acetic acid, propionic acid, butyric acid, succinic acid, cyclohexanecarboxylic acid, octanoic acid, maleic acid, 2-chloropropionic acid, cyanoacetic acid, trifluoroacetic acid, perfluorooctanoic acid, benzoic acid, pentafluorobenzoic acid, phthalic acid, etc.), sulfonic acids (methanesulfonic acid, ethanesulfonic acid, trifluoromethanesulfonic acid, p-toluenesulfonic acid, pentafluorobenzenesulfonic acid, etc.), phosphoric acids and phosphonic acids (dimethyl phosphate, phenylphosphonic acid, etc.), Lewis acids (boron trifluoride etherate, scandium triflate, alkyl titanates, aluminates, etc.), and heteropoly acids (phosphomolybdic acid, phosphotungstic acid, etc.)

(b2) Organic or Inorganic Bases

Examples of inorganic bases include sodium hydroxide, potassium hydroxide, calcium hydroxide, magnesium hydroxide, aluminum hydroxide, and ammonia, and examples of organic base compounds include amines (ethylenediamine, diethylenetriamine, triethylenetetramine, tetraethylenepentamine, triethylamine, dibutylamine, tetramethylethylenediamine, piperidine, piperazine, morpholine, ethanolamine, diazabicycloundecene, quinuclidine, aniline, pyridine, etc.), phosphines (triphenylphosphine, trimethylphosphine, etc.), and metal alkoxides (sodium methylate, potassium ethylate, etc.)

(b3) Metal Chelate Compounds

Any compounds may be used without particular restrictions as long as an alcohol represented by the formula $R^{10}OH$ (in the formula, $R^{10}$ denotes an alkyl group having 1 to 6 carbons) and a diketone represented by $R^{11}COCH_2COR^{12}$ (in the formula, $R^{11}$ denotes an alkyl group having 1 to 6 carbons, and $R^{12}$ denotes an alkyl group having 1 to 6 carbons or an alkoxy group having 1 to 16 carbons) coordinate as ligands to a central metal. Within this category, two or more types of metal chelate compounds may be used in combination.

Particularly preferred metal chelate compounds of the present invention are those having Al, Ti, or Zr as a central metal, are preferably selected from the group consisting of compounds represented by the formulae $Zr(OR^{10})_{p1}(R^{11}COCHCOR^{12})_{p2}$ (p1 and p2 are integers of 0 to 4, and the sum total thereof is 4), $Ti(OR^{10})_{q1}(R^{11}COCHCOR^{12})_{q2}$ (q1 and q2 are integers of 0 to 4, and the sum total thereof is 4), and $Al(OR^{10})_{r1}(R^{11}COCHCOR^{12})_{r2}$ (r1 and r2 are integers of 0 to 3, and the sum total thereof is 3), and exhibit an action in promoting a condensation reaction of the reactive metal compound and/or the oligomeric reactive metal compound.

$R^{10}$ and $R^{11}$ in the metal chelate compound may be identical to or different from each other, and are alkyl groups having 1 to 6 carbons, specific examples thereof including ethyl, n-propyl, i-propyl, n-butyl, sec-butyl, t-butyl, n-pentyl, and phenyl. $R^{12}$, in addition to being the same kind of alkyl group having 1 to 6 carbons, is also an alkoxy group having 1 to 16 carbons, and examples thereof include methoxy, ethoxy, n-propoxy, i-propoxy, n-butoxy, sec-butoxy, t-butoxy, lauryl, and stearyl. Furthermore, p1 to r2 in the metal chelate compound denote integers determined so as to give four- or six-coordination.

Specific examples of these metal chelate compounds include zirconium chelate compounds such as tri-n-butoxyethylacetoacetato zirconium, di-n-butoxy-bis(ethylacetoacetato)zirconium, n-butoxytris(ethylacetoacetato)zirconium, tetrakis(n-propylacetoacetato)zirconium, tetrakis(acetylacetoacetato)zirconium, and tetrakis(ethylacetoacetato)zirconium; titanium chelate compounds such as diisopropoxy-bis(ethylacetoacetato)titanium, diisopropoxy-bis(acetylacetato)titanium, and diisopropoxy-bis(acetylacetone)titanium; and aluminum chelate compounds such as diisopropoxyethylacetoacetato aluminum, diisopropoxyacetylacetonato aluminum, isopropoxy-bis(ethylacetoacetato)aluminum, isopropoxy-bis(acetylacetonato)aluminum, tris(ethylacetoacetato)aluminum, tris(acetylacetonato)aluminum, and monoacetylacetonato-bis(ethylacetoacetato)aluminum.

Among these metal chelate compounds, tri-n-butoxyethylacetoacetato zirconium, diisopropoxy-bis(acetylacetonato)titanium, diisopropoxyethylacetoacetato aluminum, and tris(ethylacetoacetato)aluminum are preferable. These metal chelate compounds may be used singly or in a combination of two or more types. It is also possible to use a partial hydrolyzate of these metal chelate compounds.

In the present invention, an aluminum chelate compound or a titanium chelate compound is more preferably used as a catalyst.

(b4) Organometallic Compounds

Preferred organometallic compounds are not particularly limited, but organotransition metals are preferable because of their high activity. Among others, tin compounds have good stability and activity and are particularly preferable. Specific examples of these compounds include carboxylic acid type organotin compounds such as $(C_4H_9)_2Sn(OCOC_{11}H_{23})_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOC_4H_9)_2$, and $Sn(OCOCC_8H_{17})_2$; mercaptide type or sulfide type organotin compounds such as $(C_4H_9)_2Sn(SCH_2COOC_8H_{17})_2$, $(C_4H_9)_2Sn(SCH_2COOC_8H_{17})_2$, $(C_8H_{17})_2Sn(SCH_2CH_2COOC_8H_{17})_2$, and $(C_8H_{17})_2Sn(SCH_2COOC_{12}H_{25})_2$; and organotin compounds such as the reaction product of an organotin oxide such as $(C_4H_9)_2SnO$, $(C_8H_{17})_2SnO$, $(C_4H_9)_2SnO$, or $(C_8H_{17})_2SnO$ and an ester compound such as dimethyl maleate, diethyl maleate, or dioctyl phthalate.

(b5) Metal Salts

With regard to the metal salts, an alkali metal salt of an organic acid (e.g., sodium naphthenate, potassium naphthenate, sodium octanoate, sodium 2-ethylhexanoate, potassium laurate, etc.) is preferably used.

The proportion of a sol/gel catalyst compound in the composition is 0.01 to 50 wt % relative to the starting reactive metal compound, preferably 0.1 to 50 wt %, and more preferably 0.5 to 10 wt %.

The catalyst may or may not be removed from a film that has been subjected to hydrolysis and condensation, and when an acid catalyst or a base catalyst is used, it may be neutralized. A volatile catalyst may be removed by vacuum, or may be removed by a means such as washing with an appropriate organic solvent, an aqueous solvent, or a washing agent.

In the present invention, water is added for the hydrolysis-condensation reaction of the reactive metal compound and/or the oligomeric reactive metal compound. The amount of water used is usually 1.2 to 3.0 equivalents per hydrolyzable group of the reactive metal compound, and preferably on the order of 1.3 to 2.0 equivalents, but it is also possible to substantially omit water or reduce the amount of water added by utilizing moisture contained as saturated water in the cellulose acylate or moisture in the environment.

The amount of catalyst added for hydrolysis is preferably 0.1% to 20% with respect to the equivalent weight of the alkoxy group of the reactive metal compound added, more preferably 0.5% to 10%, and particularly preferably 1% to 5%.

The temperature for the hydrolysis and condensation is not particularly limited as long as it is practicable. In general, the higher the reaction temperature, the higher the reaction speed, and it is therefore preferable to take sufficient time for the reaction to proceed sufficiently according to the reaction temperature.

Compound Having Ability to Coordinate as Chelate

From the viewpoint of adjustment of the sol/gel reaction speed and improvement of the solution stability, it is preferable to use a compound having the ability to coordinate as a chelate. β-Diketones and/or β-ketoesters represented by the formula $R^{11}COCH_2COR^{12}$ are preferably used, and function as agents for improving the stability of the composition of the present invention. That is, they suppress the action of promoting a condensation reaction of the reactive metal compound by the metal chelate compound by coordinating to the metal atom of the metal chelate compound (preferably a zirconium, titanium and/or aluminum compound) that is present in the above-mentioned promotion solution, thereby controlling the curing speed of the film obtained. $R^{11}$ and $R^{12}$ are the same as $R^{11}$ and $R^{12}$ constituting the metal chelate compound above, but they do not necessarily have the same structure when used.

Specific examples of the β-diketones and/or the β-ketoesters include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, and 5-methylhexanedione. Among these compounds, ethyl acetoacetate and acetylacetone are preferable, and acetylacetone is particularly preferable. These β-diketones and/or β-ketoesters may be used singly or in a combination of two or more types. Such a β-diketone and/or β-ketoester is used at 2 moles or more per mole of the metal chelate compound, and preferably 3 to 20 moles; if it is less than 2 moles, the storage stability of the composition obtained is poor.

In the present invention, the cellulose acylate film, which comprises a cellulose acylate satisfying a specific degree of substitution and a hydrolysis-condensation product of a hydrolyzable and polycondensable reactive metal compound, exhibits little humidity dependence of the retardation, and although the detailed reason is not clear, it is surmised to be as follows.

That is, it is surmised that, by forming a polymer or a structure of a reactive metal compound in the cellulose acylate film, expansion of the film due to moisture absorption is suppressed, and consequently the change in retardation with changes in humidity is reduced. It is also surmised that, when a cellulose acylate having a total degree of substitution of less than 2.5 is used, the cellulose acylate itself is significantly hydrophilic, and even if a polymer or a structure of a reactive metal compound is formed, the effect cannot be exhibited sufficiently.

Other Additives

It is possible to add, to the cellulose acylate film of the present invention, various additives (e.g., a plasticizer, a UV inhibitor, a degradation inhibitor, an optical anisotropy control agent, fine particles, a release agent, an infrared absorber, etc.) in each preparation step according to the intended application, and they may be a solid or an oily material. That is, there is no limitation on the melting point or the boiling point. For example, a mixture of an ultraviolet absorbing material having a melting point of 20° C. or less and an ultraviolet absorbing material having a melting point of 20° C. or higher, or a mixture of plasticizers in a similar manner. is described in, for example, JP-A-2001-151901. Furthermore, an infrared absorbing dye is described in, for example, JP-A-2001-194522. The timing for the addition thereof can be any time during the dope preparation process, but it may be carried out by employing a step of adding an additive as a final step of the dope preparation process. Furthermore, the amount of each material added is not particularly limited as long as the function is exhibited. Moreover, when a cellulose acylate film is formed from multiple layers, the type and amount of additive added to each layer may be different. These techniques are conventionally known and are described in, for example, JP-A-2001-151902.

Materials described in detail in 'Hatsumei Kyokai Koukai Giho' (Journal of Technical Disclosure) (Technical Disclosure No. 2001-1745, published Mar. 15, 2001, Japan Institute of Invention and Innovation), pp.16 to 22 are preferably used.

Organic Solvent

An organic solvent in which the cellulose acylate of the present invention is dissolved is now explained.

In the present invention, the organic solvent is not particularly limited as long as the cellulose acylate can be dissolved therein and cast to give a coating and the object can be achieved. Examples of preferred solvents include chlorinated organic solvents such as dichloromethane, chloroform, 1,2-dichloroethane, and tetrachloroethylene, and non-chlorinated organic solvents.

The non-chlorinated organic solvent used in the present invention is preferably a solvent selected from esters, ketones, and ethers having 3 to 12 carbon atoms. The esters, ketones, and ethers may have a cyclic structure. It is also possible to use as a main solvent a compound having two or more of any of the ester, ketone and ether functional groups (i.e., —O—, —CO— and —COO—), and it may have another functional group such as, for example, an alcoholic hydroxyl group. In the case of a main solvent having two or more types of functional groups, the number of carbon atoms therein should be within the range defined for the compound having a given functional group. Examples of the esters having 3 to 12 carbon atoms include ethyl formate, propyl formate, pentyl formate, methyl acetate, ethyl acetate, and pentyl acetate. Examples of the ketones having 3 to 12 carbon atoms include acetone, methyl ethyl ketone, diethyl ketone, diisobutyl ketone, cyclopentanone, cyclohexanone, and methylcyclohexanone. Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole. Examples of the organic solvent having two or more types of functional groups include 2-ethoxyethyl acetate, 2-methoxyethanol, and 2-butoxyethanol.

The organic solvent used for the above-mentioned cellulose acylate is selected from the above-mentioned various viewpoints, and it is preferably as follows. That is, a preferred mixed solvent for the cellulose acylate of the present invention is a mixture of at least three different types of solvent; the first solvent is at least one type selected from methyl acetate, ethyl acetate, methyl formate, ethyl formate, acetone, dioxolane, and dioxane, or a mixed solvent thereof, the second solvent is selected from a ketone having 4 to 7 carbon atoms and an acetoacetate ester, and the third solvent is selected from an alcohol or hydrocarbon having 1 to 10 carbon atoms, and is more preferably an alcohol having 1 to 8 carbon atoms. When the first solvent is a mixture of two or more types of solvents, the second solvent may be omitted. The first solvent is more preferably methyl acetate, acetone, methyl formate, ethyl formate, or a mixture thereof, and the second solvent is preferably methyl ethyl ketone, cyclopentanone, cyclohexanone, or methyl acetylacetate, or may be a mixture of these solvents.

The alcohol as the third solvent may be straight chain, branched, or cyclic, and thereamong a saturated aliphatic hydrocarbon is preferable. The hydroxyl group of the alcohol may be any of primary to tertiary. Examples of the alcohol include methanol, ethanol, 1-propanol, 2-propanol, 1-butanol, 2-butanol, 2-methyl-2-propanol, 1-pentanol, 2-methyl-2-butanol, and cyclohexanol. A fluoroalcohol can also be used as the alcohol. Examples thereof include 2-fluoroethanol, 2,2,2-trifluoroethanol, and 2,2,3,3-tetrafluoro-1-propanol. Furthermore, the hydrocarbon may be straight chain, branched, or cyclic. Either an aromatic hydrocarbon or an aliphatic hydrocarbon can be used. The aliphatic hydrocarbon may be saturated or unsaturated. Examples of the hydrocarbon include cyclohexane, hexane, benzene, toluene, and xylene. The alcohol and the hydrocarbon as the third solvent may be used singly or as a mixture of two or more types, and are not particularly limited. Specific preferred compounds as the third solvent include alcohols such as methanol, ethanol, 1-propanol, 2-propanol, 1-butanol, 2-butanol, and cyclohexanol, cyclohexane, and hexane, and in particular methanol, ethanol, 1-propanol, 2-propanol, and 1-butanol.

With regard to the above-mentioned mixture of three types of solvents, the first solvent is preferably contained at 20 to 95 wt %, the second solvent at 2 to 60 wt %, and the third solvent at 2 to 30 wt %, and more preferably the first solvent is contained at 30 to 90 wt %, the second solvent at 3 to 50 wt %, and the third solvent at 3 to 25 wt %. Particularly preferably, the first solvent is contained at 30 to 90 wt %, the second solvent at 3 to 30 wt %, and the third solvent at 3 to 15 wt %. When the first solvent is a mixed solvent and the second solvent is not used, the first solvent is preferably contained at 70 to 95 wt % and the third solvent at 5 to 30 wt %, and more preferably the first solvent is contained at 75 to 93 wt % and the third solvent at 7 to 25 wt %. The above-mentioned non-chlorinated organic solvents used in the present invention are described in detail in 'Hatsumei Kyokai Koukai Giho' (Journal of Technical Disclosure) (Technical Disclosure No. 2001-1745, published Mar, 15, 2001, Japan Institute of Invention and Innovation), pp. 12 to 16.

Methyl acetate/acetone/methanol/ethanol/butanol (75/10/5/5/5, parts by weight),
Methyl acetate/acetone/methanol/ethanol/propanol (75/10/5/5/5, parts by weight),
Methyl acetate/acetone/methanol/butanol/cyclohexane (75/10/5/5/5, parts by weight),
Methyl acetate/acetone/ethanol/butanol (81/8/7/4, parts by weight)
Methyl acetate/acetone/ethanol/butanol (82/10/4/4, parts by weight)
Methyl acetate/acetone/ethanol/butanol (80/10/4/6, parts by weight)
Methyl acetate/methyl ethyl ketone/methanol/butanol (80/10/5/5, parts by weight),
Methyl acetate/acetone/methyl ethyl ketone/ethanol/isopropyl alcohol (75/10/10/5/7, parts by weight),
Methyl acetate/cyclopentanone/methanol/isopropyl alcohol (80/10/5/8, parts by weight),
Methyl acetate/acetone/butanol (85/5/5, parts by weight),
Methyl acetate/cyclopentanone/acetone/methanol/butanol (60/15/15/5/6, parts by weight),
Methyl acetate/cyclohexanone/methanol/hexane (70/20/5/5, parts by weight),
Methyl acetate/methyl ethyl ketone/acetone/methanol/ethanol (50/20/20/5/5, parts by weight),
Methyl acetate/1,3-dioxolane/methanol/ethanol (70/20/5/5, parts by weight),
Methyl acetate/dioxane/acetone/methanol/ethanol (60/20/10/5/5, parts by weight),
Methyl acetate/acetone/cyclopentanone/ethanol/isobutyl alcohol/cyclohexane (65/10/10/5/5/5, parts by weight),
Methyl formate/methyl ethyl ketone/acetone/methanol/ethanol (50/20/20/5/5, parts by weight),
Methyl formate/acetone/ethyl acetate/ethanol/butanol/hexane (65/10/10/5/5/5, parts by weight),
Acetone/methyl acetoacetate/methanol/ethanol (65/20/10/5, parts by weight),
Acetone/cyclopentanone/ethanol/butanol (65/20/10/5, parts by weight),
Acetone/1,3-dioxolane/ethanol/butanol (65/20/10/5, parts by weight),
1,3-Dioxolane/cyclohexanone/methyl ethyl ketone/methanol/butanol (55/20/10/5/5, parts by weight), etc. can be cited.

Furthermore, it is also possible to prepare a cellulose acylate solution by the following methods.

A cellulose acylate solution is prepared from methyl acetate/acetone/ethanol/butanol (81/8/7/4, parts by weight), filtered, and concentrated, and subsequently 2 parts by weight of butanol is added thereto.

A cellulose acylate solution is prepared from methyl acetate/acetone/ethanol/butanol (84/10/4/2, parts by weight), filtered, and concentrated, and subsequently 4 parts by weight of butanol is added thereto.

A cellulose acylate solution is prepared from methyl acetate/acetone/ethanol (84/10/6, parts by weight), filtered, and concentrated, and subsequently 5 parts by weight of butanol is added thereto.

The dope used in the present invention may contain, other than the above-mentioned non-chlorinated organic solvent, dichloromethane at 10 wt % or less of the total amount of organic solvent.

Furthermore, when preparing the cellulose acylate solution of the present invention, it is possible to use a chlorinated organic solvent as a main solvent in some cases. In the present invention, the chlorinated organic solvent is not particularly limited as long as the cellulose acylate can be dissolved, then cast and made into a film. Preferred examples of the chlorinated organic solvent include dichloromethane and chloroform. Dichloromethane is particularly preferable. Furthermore, there is no particular problem in mixing an organic solvent other than the chlorinated organic solvent. In this case, dichloromethane is preferably used at 50 wt % or more. The non-chlorinated organic solvent used in combination in the present invention is described below. That is, the non-chlorinated organic solvent is preferably a solvent selected from esters, ketones, ethers, alcohols, and hydrocarbons having 3 to 12 carbon atoms, etc. The esters, ketones, ethers, and alcohols may have a cyclic structure. A compound having two or more ester, ketone, or ether functional groups (i.e., —O—, —CO—, or —COO—) can also be used as a solvent, and it is also possible to simultaneously have another functional group such as, for example, an alcoholic hydroxyl group. In the case in which a solvent having two or more types of functional groups is used, the number of carbon atoms thereof should be in the range defined for the compound having a given functional group. Examples of the esters having 3 to 12 carbon atoms include ethyl formate, propyl formate, pentyl formate, methyl acetate, ethyl acetate, and pentyl acetate. Examples of the ketones having 3 to 12 carbon atoms include acetone, methyl ethyl ketone, diethyl ketone, diisobutyl ketone, cyclopentanone, cyclohexanone, and methylcyclohexanone. Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole. Examples of the organic solvent having two or more types of functional groups include 2-ethoxyethyl acetate, 2-methoxyethanol, and 2-butoxyethanol.

The alcohol used in combination with the chlorinated organic solvent is preferably straight-chain, branched, or cyclic, and thereamong a saturated aliphatic hydrocarbon is preferable. The hydroxyl group of the alcohol may be any of primary to tertiary. Examples of the alcohol include methanol, ethanol, 1-propanol, 2-propanol, 1-butanol, 2-butanol, 2-methyl-2-propanol, 1-pentanol, 2-methyl-2-butanol, and cyclohexanol. A fluoroalcohol can also be used as the alcohol. Examples thereof include 2-fluoroethanol, 2,2,2-trifluoroethanol, and 2,2,3,3-tetrafluoro-1-propanol. Furthermore, the hydrocarbon may be straight-chain, branched, or cyclic. Either an aromatic hydrocarbon or an aliphatic hydrocarbon can be used. The aliphatic hydrocarbon may be saturated or unsaturated. Examples of the hydrocarbon include cyclohexane, hexane, benzene, toluene, and xylene.

The non-chlorinated organic solvent used in combination with the chlorinated organic solvent, which is a main solvent used in the cellulose acylate, is not particularly limited, but it is selected from methyl acetate, ethyl acetate, methyl formate, ethyl formate, acetone, dioxolane, dioxane, ketones and acetoacetate esters having 4 to 7 carbon atoms, and alcohols and hydrocarbons having 1 to 10 carbons. Examples of a preferred non-chlorinated organic solvent used in combination include methyl acetate, acetone, methyl formate, ethyl formate, methyl ethyl ketone, cyclopentanone, cyclohexanone, methyl acetylacetate, methanol, ethanol, 1-propanol, 2-propanol, 1-butanol, 2-butanol, cyclohexanol, cyclohexane, and hexane. Combinations with the chlorinated organic solvent, which is a preferred main solvent of the present invention, are listed below, but should not be construed as being limiting thereto.

Dichloromethane/methanol/ethanol/butanol (75/10/5/5, parts by weight),
Dichloromethane/acetone/methanol/propanol (80/10/5/5, parts by weight),
Dichloromethane/methanol/butanol/cyclohexane (75/10/5/5, parts by weight),
Dichloromethane/methyl ethyl ketone/methanol/butanol (80/10/5/5, parts by weight),
Dichloromethane/acetone/methyl ethyl ketone/ethanol/isopropyl alcohol (75/10/10/5/7, parts by weight),
Dichloromethane/cyclopentanone/methanol/isopropyl alcohol (80/10/5/8, parts by weight),
Dichloromethane/methyl acetate/butanol (80/10/10, parts by weight),
Dichloromethane/cyclohexanone/methanol/hexane (70/20/5/5, parts by weight),
Dichloromethane/methyl ethyl ketone/acetone/methanol/ethanol (50/20/20/5/5, parts by weight),
Dichloromethane/1,3-dioxolane/methanol/ethanol (70/20/5/5, parts by weight),
Dichloromethane/dioxane/acetone/methanol/ethanol (60/20/10/5/5, parts by weight),
Dichloromethane/acetone/cyclopentanone/ethanol/isobutyl alcohol/cyclohexane (65/10/10/5/5/5, parts by weight),
Dichloromethane/methyl ethyl ketone/acetone/methanol/ethanol (70/10/10/5/5, parts by weight),
Dichloromethane/acetone/ethyl acetate/ethanol/butanol/hexane (65/10/10/5/5/5, parts by weight),
Dichloromethane/methyl acetoacetate/methanol/ethanol (65/20/10/5, parts by weight),
Dichloromethane/cyclopentanone/ethanol/butanol (65/20/10/5, parts by weight), etc.

The cellulose acylate of the present invention is dissolved in an organic solvent to form a 10 to 30 wt % cellulose acylate solution, preferably 13 to 27 wt %, and particularly preferably 15 to 25 wt %. With regard to a method for achieving these concentrations of the cellulose acylate, it may be dissolved so as to give a predetermined concentration, or a low concentration solution (e.g. 9 to 14 wt %) may be prepared first, and a predetermined high concentration solution may be prepared in a concentrating step, which will be described later. Alternatively, a high concentration cellulose acylate solution may be prepared first, and various types of additives may then be added thereto to give a predetermined low concentration cellulose acylate solution, and any of the methods can be carried out without any particular problem as long as the cellulose acylate solution concentration of the present invention can be achieved.

In the present invention, to the cellulose acylate solution are added a hydrolyzable-polycondensable reactive metal compound, water and a catalyst, which are used in a sol/gel method so as to effect hydrolysis-polycondensation, and a necessary additive, thus carrying out hydrolysis and condensation reactions. The timing, amount, and order of addition of these materials can be selected freely according to the intended purpose; the hydrolysis and condensation reaction may be carried out partially before casting the composition, casting may then be carried out, and the reaction may be completed in a subsequent step, or there may be substantially no reaction carried out in the composition state, and the reaction may be completed in a subsequent step.

In the present invention, the cellulose acylate film, which comprises a cellulose acylate satisfying a specific degree of substitution and the hydrolysis-condensation product of an oligomeric hydrolysis-condensation product of a hydrolyzable and polycondensable reactive metal compound, exhibits little humidity dependence of the retardation, and although the detailed reason is not clear, it is surmised to be as follows.

That is, it is surmised that forming a polymer or a structure of the reactive metal compound in the cellulose acylate film enables expansion of the film due to moisture absorption to be suppressed, and as a result the change in retardation with changes in humidity is reduced. It is also surmised that, when a cellulose acylate having a low total degree of substitution is used, the cellulose acylate itself is significantly hydrophilic, and even if a polymer or a structure of the reactive metal compound is formed, the above-mentioned effect cannot be exhibited sufficiently.

A process for producing the cellulose acylate film of the present invention is now explained.

Solution Preparation Step

With regard to preparation of a cellulose acylate solution (dope) in the present invention, the dissolution method is not particularly limited; it may be carried out at room temperature, it may employ a cooling dissolution method or a high temperature dissolution method, or these methods may be combined. With regard to these methods, for example, JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017, and JP-A-11-302388 describe preparation methods for a cellulose acylate solution. These dissolution methods for a cellulose acylate in an organic solvent can be applied to the present invention as appropriate if they are within the scope of the present invention. Details thereof, in particular the non-chlorinated solvent type, are described in 'Hatsumei Kyokai Koukai Giho' (Journal of Technical Disclosure) (Technical Disclosure No. 2001-1745, published Mar. 15, 2001, Japan Institute of Invention and Innovation), pp. 22 to 25. Furthermore, the cellulose acylate dope solution of the present invention is usually subjected to solution concentration and filtration, and details thereof are also described in 'Hatsumei Kyokai Koukai Giho' (Journal of Technical Disclosure) (Technical Disclosure No. 2001-1745, published Mar. 15, 2001, Japan Institute of Invention and Innovation), p. 25. When dissolution is carried out at high temperature, the temperature is often the boiling point of the organic solvent used or higher, and in this case a pressurized state is employed.

In the present invention, the cellulose acylate solution preferably has a viscosity and dynamic storage modulus in certain ranges. 1 mL of a sample solution is measured using a rheometer (CLS 500) with a 4 cm diameter/2° steel cone (both manufactured by TA Instruments). Measurement conditions are Oscillation Step/Temperature Ramp in the range of 40° C. to −10° C. changing at 2° C./minute, and the static non-Newtonian viscosity $n^*(Pa \cdot s)$ at 40° C. and the storage modulus $G'$ (Pa) at −5° C. are determined. After the sample solution is heated to a measurement starting temperature and maintained at that temperature to give a constant solution temperature, measurement is then started. In the present invention, the viscosity at 40° C. is preferably 1 to 400 Pa·s, the dynamic storage modulus at 15° C. is preferably 100 Pa or greater, the viscosity at 40° C. is more preferably 10 to 200 Pa·s, and the dynamic storage modulus at 15° C. is more preferably 100 to 1,000,000 Pa. The higher the dynamic storage modulus at low temperature, the more preferable it is and, for example, in a case in which a casting support is at −5° C., the dynamic storage modulus at −5° C. is preferably 10,000 to 1,000,000 Pa, and in a case in which the support is at −50° C., the dynamic storage modulus at −50° C. is preferably 10,000 to 5,000,000 Pa.

Casting Step to Film Formation Step

A method and equipment for producing a cellulose acylate film of the present invention employ a solution cast film formation method and solution cast film formation equipment that are conventionally employed for production of a cellulose acylate film. A dope (cellulose acylate solution) prepared in a dissolution machine (vessel) is first stored in a storage vessel so as to degas bubbles contained in the dope, and then subjected to final preparation. The dope is fed from a dope discharge opening to a pressure type die via a pressure type metering gear pump that can meter a feed solution with high precision by means of, for example, rotational speed; the dope is uniformly cast on a metal support of an endlessly running casting section via a mouthpiece (slit) of the pressure type die, and when the metal support has gone substantially once around and reached a release point, a half-dried dope film (also called a 'web') is released from the metal support. Opposite edges of the web thus obtained are pinched by clips, the web is dried while being held widthwise and carried by a tenter, is then carried by a group of rolls of a dryer so as to complete drying, and a predetermined length thereof is wound up by a winder. The combination of the tenter and the group of rolls of the dryer depends on the intended purpose. In a solution cast film method used for a silver halide photosensitive material or a functional protective film for an electronic display, in addition to the solution cast film formation device, a coating device for processing the film surface with an undercoat layer, an antistatic layer, an antihalation layer, a protective layer, etc. is often added. These production steps are described in detail in 'Hatsumei Kyokai Koukai Giho' (Journal of Technical Disclosure) (Technical Disclosure No. 2001-1745, published Mar. 15, 2001, Japan Institute of Invention and Innovation), pp. 25 to 30, and they are classified into casting (including cocasting), metal support, drying, releasing, drawing, etc.

In the present invention, the space temperature of the casting section is not particularly limited, but it is preferably −50° C. to 50° C. It is more preferably −30° C. to 40° C., and particularly preferably −20° C. to 30° C. In particular, a cellulose acylate solution that is cast at a low space temperature is instantaneously cooled on the support, thus increasing the gel strength and thereby holding the film, which contains an organic solvent. By so doing, it is possible to release the cellulose acylate from the support in a short period of time without evaporating the organic solvent, thus enabling high speed casting to be achieved. With regard to means for space cooling, normal air, nitrogen, argon, helium, etc. may be employed, and the means is not particularly limited. In this case, the humidity is preferably 0% RH to 70% RH, and more preferably 0% RH to 50% RH. Furthermore, in the present invention, the temperature of the support of the casting section, in which the cellulose acylate solution is cast, is −50° C. to 130° C., preferably −30° C. to 25° C., and more preferably −20° C. to 15° C. In order to maintain the casting section at the temperature of the present invention, a cooled gas may be introduced to the casting section, or a cooling device may be disposed in the casting section so as to cool the space. In this arrangement, it is important that attention is paid to preventing water from becoming attached, and this can be achieved by a method utilizing a dried gas.

Particularly preferred contents and casting of each layer in the present invention are as follows. That is, the cellulose acylate solution contains, at 25° C., at least one type of liquid or solid plasticizer at 0.1 to 20 wt % relative to the cellulose acylate, and/or at least one type of liquid or solid ultraviolet absorbing agent at 0.001 to 5 wt % relative to the cellulose acylate, and/or at least one type of solid particulate powder having an average particle size of 5 to 3000 nm at 0.001 to 5 wt % relative to the cellulose acylate, and/or at least one type of fluorine type surfactant at 0.001 to 2 wt % relative to the cellulose acylate, and/or at least one type of release agent at 0.0001 to 2 wt % relative to the cellulose acylate, and/or at least one type of degradation inhibitor at 0.0001 to 2 wt % relative to the cellulose acylate, and/or at least one type of optical anisotropy control agent at 0.1 to 15 wt % relative to the cellulose acylate, and/or at least one type of infrared absorbing agent at 0.1 to 5 wt % relative to the cellulose acylate, and a cellulose acylate film prepared using the cellulose acylate solution above, wherein a homopolymer or copolymer formed by polymerizing a monomer containing at least one type of hydrolysis-condensation product of a hydrolyzable and polycondensable reactive metal compound is included.

In the casting step, one type of cellulose acylate solution may be cast as a single layer, or two or more types of cellulose acylate solutions may be co-cast simultaneously and/or successively. When two or more layers are cast, it is preferable that, with regard to the cellulose acylate solution and the cellulose acylate film prepared therefrom, the composition of the chlorinated solvent of each layer is either identical or different, the additives of each layer are either of a single type or a mixed type of two or more kinds, the position of addition of additives to the layers is either the same layer or different layers, the concentrations of the additives in the solution of each layer are either identical or different, the aggregate molecular weight of each layer is either identical or different, the temperature of the solution of each layer is either identical or different, the amount of coating of each layer is either identical or different, the viscosity of each layer is either identical or different, the film thickness after drying of each layer is either identical or different, the materials present in each layer are either in an identical state or distribution or in a different state or distribution, the physical properties of each layer are either identical to each other or different from each other, and the physical properties of each layer are either uniform or different physical properties are distributed. The physical properties referred to here include physical properties described in detail in 'Hatsumei Kyokai Koukai Giho' (Journal of Technical Disclosure) (Technical Disclosure No. 2001-1745, published Mar. 15, 2001, Japan Institute of Invention and Innovation), pp. 6 to 7, and examples thereof include haze, transmittance, spectroscopic characteristics, retardation Re, retardation Rth, molecular orientation axis, axial displacement, tear strength, bending strength, tensile strength, difference in Rt between inner and outer windings, creaking, dynamic friction, alkaline hydrolysis, curl value, water content, amount of residual solvent, thermal shrinkage, high humidity dimensional evaluation, water vapor permeability, base planarity, dimensional stability, thermal shrinkage starting temperature, modulus of elasticity, and bright point foreign matter and, furthermore, impedance and surface condition used for the evaluation of a base. Moreover, there are also included yellow index, transparency, and thermophysical properties (Tg, heat of crystallization) of the cellulose acylate, these being described in detail in 'Hatsumei Kyokai Koukai Giho' (Journal of Technical Disclosure) (Technical Disclosure No. 2001-1745, published Mar. 15, 2001, Japan Institute of Invention and Innovation), p. 11.

The cellulose acylate film of the present invention may be drawn. With regard to a tenter drying device, either a pin tenter method or a clip tenter method may be used, and with regard to a cellulose ester film for a liquid crystal display device, drawing is preferably carried out laterally by on the order of 0.5% to 5% using a tenter drying device. After carrying out drying, drawing may be carried out at a temperature of the Tg or higher than the Tg. The hydrolysis and condensation reactions of the present invention may be carried out in one step or multiple steps at any timing after preparing a dope and before completion of drying of a film, and it is particularly preferable that a condensation reaction is carried out utilizing heat when the film is in a drying step. Moreover, the film may be subjected to annealing by post heating.

The cellulose acylate film may be subjected to a surface treatment in some cases, thus achieving improvement of adhesion between the cellulose acylate film and functional layers (e.g., an undercoat layer and a backing layer). For example, a glow discharge treatment, an ultraviolet irradiation treatment, a corona treatment, a flame treatment, or an acid or alkali treatment can be used. The glow discharge treatment referred to here may employ low temperature plasma occurring under a low pressure gas of $10^{-3}$ to 20 Torr, but a plasma treatment under atmospheric pressure is preferable. A plasma excitation gas means a gas that is plasma-excited under the above-mentioned conditions, and examples thereof include argon, helium, neon, krypton, xenon, nitrogen, carbon dioxide, a fluorocarbon such as tetrafluoromethane, and mixtures thereof. Details thereof are described in 'Hatsumei Kyokai Koukai Giho' (Journal of Technical Disclosure) (Technical Disclosure No. 2001-1745, published Mar. 15, 2001, Japan Institute of Invention and Innovation), pp. 30 to 32. The plasma treatment at atmospheric pressure, which has been noted recently, employs a radiation energy of, for example, 20 to 500 Kgy at 10 to 1000 Kev, and preferably 20 to 300 Kgy at 30 to 500 Kev. Among these treatments, an alkali saponification treatment is particularly preferable, and this is extremely effective as a surface treatment for a cellulose acylate film.

The alkali saponification treatment is carried out by coating with a saponification liquid. With regard to a coating method, a dip coating method, a curtain coating method, an extrusion coating method, a bar coating method, and an E type coating method can be cited. The solvent for the alkali saponification treatment coating solution preferably has good wettability for application of the saponification liquid to a transparent support, and should be selected so that the saponification liquid solvent does not cause unevenness on the surface of the transparent support and a good surface condition is maintained. Specifically, an alcoholic solvent is preferable, and isopropyl alcohol is particularly preferable. An aqueous solution of a surfactant may be used as the solvent. The alkali in the alkali saponification coating solution is preferably an alkali that is soluble in the above-mentioned solvent, and potassium hydroxide and sodium hydroxide are more preferable. The pH of the saponification coating solution is preferably 10 or higher, and more preferably 12 or higher. With regard to the reaction conditions for the alkali saponification, it is preferably carried out at room temperature for at least 1 sec but not more than 5 minutes, more preferably for at least 5 sec but not more than 5 minutes, and particularly preferably for at least 20 sec but not more than 3 minutes. After the alkali saponification reaction, the surface coated with the saponification liquid is preferably washed with water or washed with an acid and then water.

A coating-type saponification treatment and provision of an alignment film coating, may be carried out successively, thus reducing the number of steps.

There is a method in which, in order to achieve adhesion between the film and an emulsion layer, a cellulose acylate film is subjected to a surface activation treatment, and then coated directly with a functional layer, thus giving adhesion, and a method in which a film is provided with an undercoat layer (adhesive layer) after subjecting the film to some surface treatment or without any surface treatment, and then coated with a functional layer. Details of these undercoat layers are described in 'Hatsumei Kyokai Koukai Giho (Journal of Technical Disclosure)' (Technical Disclosure No.

2001-1745, published Mar. 15, 2001, Japan Institute of Invention and Innovation), p. 32. With regard to the functional layer of the cellulose acylate film of the present invention, various types of functional layers are described in detail in 'Hatsumei Kyokai Koukai Giho' (Journal of Technical Disclosure) (Technical Disclosure No. 2001-1745, published Mar. 15, 2001, Japan Institute of Invention and Innovation), pp. 32 to 45.

Film Retardation

The cellulose acylate film obtained by the production process of the present invention preferably has an in-plane retardation (Re) and a retardation in the thickness direction (Rth) in the ranges below.

The Re of the cellulose acylate film of the present invention is preferably 0 to 200 nm, more preferably 25 to 100 nm, and most preferably 30 to 80 nm. The Rth is preferably 20 nm to 500 nm, more preferably 90 nm to 350 nm, and most preferably 110 nm to 320 nm.

Moreover, it is preferable that Rth≧Re.

In the present specification, the Re retardation value and Rth retardation value are calculated as follows. Re ($\lambda$) and Rth ($\lambda$) denote the in-plane retardation and retardation in the thickness direction respectively at a wavelength $\lambda$. Re ($\lambda$) is measured by shining light at a wavelength of $\lambda$ nm in a direction normal to the film using a KOBRA 21ADH (manufactured by Oji Scientific Instruments). Rth ($\lambda$) is calculated by the KOBRA 21ADH based on three retardation values, that is, the Re ($\lambda$), a retardation value measured by shining light at a wavelength of $\lambda$ nm in a direction inclined at +40° relative to the normal to the film using an in-plane phase retardation axis (determined by the KOBRA 21ADH) as the inclination axis (rotational axis), and a retardation value measured by shining light at a wavelength of $\lambda$ nm in a direction inclined at −40° relative to the normal to the film using the in-plane phase retardation axis as the inclination axis (rotational axis). During this process, it is necessary to input the film thickness and an assumed value for the average refractive index. In addition to Rth ($\lambda$), the KOBRA 21ADH calculates nx, ny, and nz. The average refractive index is 1.48 for cellulose acetate, but with regard to values of representative polymer films other than cellulose acetate for optical applications, there are cycloolefin polymer (1.52), polycarbonate (1.59), polymethyl methacrylate (1.49), polystyrene (1.59), etc. Average refractive index values of other known polymer materials can be obtained by referring to the Polymer Handbook (JOHN WILEY & SONS, INC) or catalogues of polymer films. When the average refractive index of a material is unknown, it can be measured using an Abbe refractometer. In the present specification, $\lambda$ is 590±5 nm unless otherwise specified.

Humidity Dependence of Retardation of Film

The difference between Re at 25° C./10% RH and Re at 25° C./80% RH of the cellulose acylate film of the present invention is preferably 0 nm or greater but no greater than 40 nm, and more preferably no greater than 10 nm.

The difference between Rth at 25° C./10% RH and Rth at 25° C./80% RH is preferably 0 nm or greater but no greater than 40 nm, and more preferably no greater than 15 nm.

Applications of the cellulose acylate produced in the present invention are now explained briefly. The optical film of the present invention is particularly useful as a polarizing plate protective film. In the case where it is used as a polarizing plate protective film, a method for producing the polarizing plate is not particularly limited, and the plate can be produced by a general method. There is a method in which the cellulose acylate film obtained is subjected to an alkali treatment, and it is bonded, using an aqueous solution of a completely saponified polyvinyl alcohol, to both sides of a polarizer that has been produced by dipping a polyvinyl alcohol film in an iodine solution and drawing. Instead of the alkali treatment, it may be subjected to an adhesion promotion treatment as described in JP-A-6-94915 and JP-A-6-118232. Examples of adhesives used for bonding the protective film treated surface to the polarizer include a polyvinyl alcohol-based adhesive such as polyvinyl alcohol or polyvinyl butyral and a vinyl-based latex such as butyl acrylate. The polarizing plate is formed from the polarizer and the protective films protecting the two sides thereof or, furthermore, from a protecting film on one side of the polarizing plate and a separator film on the other side. The protecting film and the separator film are used in order to protect the polarizing plate while shipping the polarizing plate, inspecting the product, etc. In this case, the protecting film is bonded in order to protect the surface of the polarizing plate, and is used on the side opposite to the side of the polarizing plate that is bonded to the liquid crystal plate. The separator film is used in order to cover an adhesive layer that is bonded to the liquid crystal plate, and is used on the side of the polarizing plate that is bonded to the liquid crystal plate. In a liquid crystal display device a substrate containing a liquid crystal is usually disposed between two polarizing plates, but the polarizing plate protective film in which the optical film of the present invention finds application can give excellent display properties in whichever position it is disposed. Since, in particular, the polarizing plate protective film on the outermost surface on the display side of the liquid crystal display device is provided with a transparent hardcoat layer, an antiglare layer, an antireflection layer, etc., the above-mentioned polarizing plate protective film is particularly preferably used in this section.

The cellulose acylate film of the present invention can be used in various applications, and it is particularly effective as an optical compensation sheet of a liquid crystal display device. The cellulose acylate film of the present invention can be used in liquid crystal cells with various display modes. Various display modes have been proposed, such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), and HAN (Hybrid Aligned Nematic). Display modes in which the above-mentioned display modes are divided and aligned have also been proposed. The cellulose acylate film of the present invention is effective in a liquid crystal display device with any display mode. Furthermore, it is effective in any of the transparent, reflective, and semi-transmissive liquid crystal display devices. The cellulose acylate film of the present invention may be used as a support of an optical compensation sheet of a TN type liquid crystal display device having a TN mode liquid crystal cell. The cellulose acylate film of the present invention may be used as a support of an optical compensation sheet of an STN type liquid crystal display device having an STN mode liquid crystal cell. In general, in the STN type liquid crystal display device, rod-shaped liquid crystal molecules in the liquid crystal cell are twisted in the range of 90 to 360 degrees, and the product ($\Delta$nd) of the refractive index anisotropy ($\Delta$n) of the rod-shaped liquid crystal molecules and the cell gap (d) is in the range of 300 to 1,500 nm. An optical compensation sheet used in an STN type liquid crystal display device is described in JP-A-2000-105316. The cellulose acylate film of the present invention is particularly advantageously used as a support of an optical compensation sheet of a VA type liquid crystal display device having a VA mode liquid crystal cell. The cellulose acylate film of the present invention is also advantageously used as a support of an optical compensation sheet of an OCB type liquid crystal display device having an OCB mode liquid crystal cell or a HAN type liquid crystal display device having a HAN mode liquid crystal cell.

The cellulose acylate film of the present invention is also advantageously used as an optical compensation sheet of TN type, STN type, HAN type, and GH (guest-host) type reflective liquid crystal display devices. These display modes have been well known for a long time. TN type reflective liquid crystal display devices are described in JP-A-10-123478, WO9848320, and Japanese Patent No. 3022477. An optical compensation sheet used in a reflective liquid crystal display device is described in WO00/65384. The cellulose acylate film of the present invention is also advantageously used as a support of an optical compensation sheet of an ASM (Axially Symmetric Aligned Microcell) type liquid crystal display device having an ASM mode liquid crystal cell. The ASM mode liquid crystal cell is characterized in that the thickness of the cell is maintained by a resin spacer whose position can be adjusted. Other properties are the same as those of the TN mode liquid crystal cell. An ASM mode liquid crystal cell and an ASM type liquid crystal display device are described in Kume et al., SID 98 Digest 1089 (1998). Specific applications of the above-mentioned cellulose acylate films are described in detail in 'Hatsumei Kyokai Koukai Giho' (Journal of Technical Disclosure) (Technical Disclosure No. 2001-1745, published Mar. 15, 2001, Japan Institute of Invention and Innovation), pp. 45 to 59.

Cellulose Derivative a) Cellulose Derivative

The cellulose derivative used preferably in the present invention is now described in detail. The cellulose derivative of the present invention satisfies the following expressions. That is, it has at least one of X and Y, and Z as substituents, and the total degree of substitution by X, Y, and Z is at least 2.5 but no greater than 3.0.

$2.5 \leq X+Y+Z \leq 3.0$ $0 < X+Y < 3.0$ $0 < Z < 3.0$ (In the expressions, X denotes the degree of substitution by acetyl, Y denotes the sum total of the degrees of substitution by acyl groups other than acetyl, and Z denotes the degree of substitution by a group represented by Formula (1).)

β-1,4 Bonded glucose units that constitute cellulose have free hydroxyl groups at the 2-, 3-, and 6-positions. The cellulose derivative is a polymer in which part or all of these hydroxyl groups are esterified. The degree of substitution means the total of the proportions esterified at each of the 2-, 3-, and 6-positions of the cellulose (100% esterification is a degree of substitution is 1). That is, a cellulose derivative whose hydroxyl groups are completely substituted has a degree of substitution of 3.

In the present invention, X denotes the degree of substituent by acetyl. A preferred range of X is 0 to 2.95, more preferably 0.2 to 2.90, and particularly preferably 0.4 to 2.90.

In the present invention, Y denotes the degree of substitution by acyl groups other than acetyl. Y may be any of an aliphatic acyl group and an aromatic acyl group.

When the acyl group of the cellulose derivative of the present invention is an aliphatic acyl group, the number of carbons is preferably 2 to 22, more preferably 2 to 8, and particularly preferably 2 to 4. Examples of the aliphatic acyl group include alkylcarbonyl, alkenylcarbonyl, and alkynylcarbonyl.

When the acyl group is an aromatic acyl group, the number of carbons is preferably 6 to 22, more preferably 6 to 18, and particularly preferably 6 to 12. These acyl groups may further have a substituent.

Preferred examples of the acyl group Y include propionyl, butyryl, heptanoyl, hexanoyl, octanoyl, decanoyl, dodecanoyl, tridecanoyl, tetradecanoyl, hexadecanoyl, octadecanoyl, isobutyryl, butyryl, cyclohexane carbonyl, oleoyl, benzoyl, naphthalenecarbonyl, phthaloyl, cinnamoyl, and t-butanoyl. Among these groups, propionyl, butyryl, dodecanoyl, octadecanoyl, t-butanoyl, oleoyl, benzoyl, naphthylcarbonyl, and cinnamoyl are more preferable, and propionyl and butyryl are particularly preferable.

A preferred range of Y is 0 to 2.95, more preferably 0.2 to 2.90, and particularly preferably 0.4 to 2.90.

A preferred range of X+Y is 1.0 to 2.95, more preferably 2.0 to 2.9, and particularly preferably 2.4 to 2.90.

In the present invention, Z denotes the degree of substitution by a group represented by Formula (1).

$$-(L^1)_m(L^2)SiR_nQ_{3-n} \qquad \text{Formula (1)}$$

(In Formula (1), $L^1$ denotes a divalent connecting group that can be bonded to an oxygen atom originating from a hydroxyl group of cellulose, $L^2$ denotes a divalent connecting group, R denotes an alkyl group, an aryl group, an alkenyl group, an alkynyl group, or a heterocyclic group, Q denotes a halogen atom, an alkoxy group, an aryloxy group, an alkenyloxy group, an alkynyloxy group, a heterocyclic oxy group, or an acyloxy group, m denotes 0 or 1, and n denotes 0, 1, or 2.)

Formula (1) is now explained further in detail.

$L^1$ denotes a divalent connecting group that can be bonded to an oxygen. atom originating from a hydroxyl group of cellulose, and $L^2$ denotes a divalent connecting group m denotes 0 or 1. Here, m being 0 means that the oxygen atom originating from the hydroxyl group at the 2-, 3-, or 6-positions of the cellulose is directly bonded to the divalent group denoted by $L^2$. $L^1$ and $L^2$ may be any combination as long as a bond can be formed therebetween.

$L^1$ is a divalent group that can be bonded to the hydroxyl group at the 2-, 3-, or 6-positions of cellulose, and preferred examples thereof include —SO$_2$—, —S=O—, —C=O—, and —C=ONH—; —C=O— and —O—C=ONH— are more preferable, and —O—C=ONH— is particularly preferable.

$L^2$ denotes a divalent connecting group preferably having 0 to 40 atoms and 0 to 20 carbons, more preferably 1 to 30 atoms and 0 to 10 carbons, and particularly preferably 0 to 20 atoms and 0 to 6 carbons. Here, the number of atoms of $L^2$ being 0 means that the groups at opposite ends of the connecting group directly form a single bond. The group is a divalent connecting group, and preferably a group selected from an alkylene group, an arylene group, —O—, —S—, —S=O—, —S(=O)$_2$—, —C=O—, —NR$^1$— (R$^1$ denotes an alkyl group, an aryl group, an alkenyl group, an alkynyl group, or a heterocyclic group), a divalent heterocyclic group, and a composite substituent formed by combination of the above groups.

Among these groups, preferred examples of $L^2$ include an alkylene group (e.g., methylene, ethylene, ethylidene, trimethylene, tetramethylene, pentamethylene, hexamethylene, methylethylene, ethylethylene, etc.), an alkenylene group (vinylene, propenylene, etc.), a cyclic alkylene group (e.g., cis-1,4-cyclohexylene, trans-1,4-cyclohexylene, 1,3-cyclopentylidene, etc.), an arylene group (o-phenylene, m-phenylene, p-phenylene, etc.), —O—, —S—, —S=O—, —S(=O)$_2$—, —C=O—, sulfonamide, ureylene, thioureylene, —NR$^1$— (R$^1$ is for example a hydrogen atom, methyl, ethyl, propyl, butyl, pentyl, hexyl, cyclohexyl, octyl, phenyl, etc.), and a divalent heterocyclic group (pyridinediyl, furandiyl, thiophenediyl, piperidinediyl, quinolinediyl, etc.). These divalent groups may be bonded to each other to form a divalent composite group. Examples of the composite substituent include —(CH$_2$)$_2$O—, —(CH$_2$)$_2$O(CH$_2$)$_2$—, —(CH$_2$)$_2$O(CH$_2$)$_2$O(CH$_2$)—, —(CH$_2$)$_2$S(CH$_2$)$_2$—, —(CH$_2$)$_2$O$_2$C(CH$_2$)$_2$—, —CH$_2$NH—, —CH$_2$O—, —CH$_2$S—, —OCH$_2$—, —SCH$_2$—, —NHCH$_2$—, —CH$_2$NH(CH$_2$)$_2$—, —CH$_2$NH(CH$_2$)$_2$O—, —C=ONH(CH$_2$)$_2$—, and —C=OO(CH$_2$)$_2$O—.

R denotes an alkyl group, an aryl group, an alkenyl group, an alkynyl group, or a heterocyclic group. It preferably denotes an alkyl group, aryl group, alkenyl group, alkynyl group, or heterocyclic group having 1 to 20 carbons, more preferably 1 to 16, and particularly preferably 1 to 12. Preferred examples of R include an alkyl group (methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, etc.), a cycloalkyl group (cyclopentyl, cyclohexyl, cycloheptyl, 2,6-dimethylcyclohexyl, 4-t-butylcyclohexyl, cyclopentyl, 1-adamantyl, 2-adamantyl, bicyclo[2,2,2]octan-3-yl, etc.), an alkenyl group (e.g., vinyl, allyl, prenyl, geranyl, oleyl, 2-cyclopenten-1-yl, 2-cyclohexen-1-yl), an alkynyl group (e.g., ethynyl, propargyl), an aryl group (e.g., phenyl, p-tolyl, naphthyl, m-chlorophenyl, o-hexadecanoylaminophenyl), and a heterocyclic group (e.g., 2-furyl, 2-thienyl, 2-pyrimidinyl, 2-benzothiazolyl).

R may further have a substituent, and examples of the substituent include a halogen atom, an alkyl group (including a monocyclic cycloalkyl group and a polycyclic cycloalkyl group), an alkenyl group (including a monocyclic cycloalkenyl group and a polycyclic cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl or aryl sulfonylamino group, a mercapto group, an alkylthio group, an arylthio group, a heterocyclic thio group, a sulfamoyl group, a sulfo group, an alkyl or aryl sulfinyl group, an alkyl or aryl sulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphate ester group, and a silyl group.

Q is a halogen atom (e.g., chlorine atom, bromine atom, iodine atom), an alkoxy group preferably having 1 to 20 carbons, more preferably 1 to 15 carbons, and particularly preferably 1 to 10 carbons (e.g., methoxy, ethoxy, propoxy, isopropyloxy, butoxy, pentyloxy, hexyloxy, cyclohexyloxy, octyloxy, benzyloxy, 2-phenylethoxy), an aryloxy group preferably having 6 to 20 carbons, more preferably 6 to 15 carbons, and particularly preferably 6 to 10 carbons (e.g., phenoxy, 4-chlorophenoxy, 2-chlorophenoxy, 2-methoxyphenoxy, etc.), an alkenyloxy group preferably having 2 to 20 carbons, more preferably 2 to 15 carbons, and particularly preferably 2 to 10 carbons (e.g., vinyloxy, propenyloxy, 2-methylpropenyloxy, etc.), an alkynyloxy group preferably having 2 to 20 carbons, more preferably 2 to 15 carbons, and particularly preferably 2 to 10 carbons (e.g., acetyleneoxy, etc.), a heterocyclic oxy group preferably having 1 to 20 carbons, more preferably 1 to 15 carbons, and particularly preferably 1 to 10 carbons (e.g., a pyridineoxy group, etc.), or an acyloxy group preferably having 1 to 20 carbons, more preferably 1 to 15 carbons, and particularly preferably 1 to 10 carbons (e.g., acetoxy, propionyloxy, butyryloxy, benzoyloxy, etc.)

Preferred examples of the group represented by Formula (1) are listed below, but the present invention should not be construed as being limited thereto.

$(C_2H_5O)_3Si(CH_2)_3NHCO$—
$(CH_3O)_3Si(CH_2)_3NHCO$—
$(C_2H_5O)_3Si(CH_2)_4NHCO$—
$(CH_3O)_3Si(CH_2)_4NHCO$—
$(C_6H_5O)_3Si(CH_2)_3NHCO$—
$(C_6H_5O)_3Si(CH_2)_4NHCO$—
$(C_2H_5O)_3Si(CH_2)_5NHCO$—
$(C_2H_5O)_3Si(CH_2)_2CO$—
$(C_2H_5O)_3Si(CH_2)_3CO$—
$(CH_3O)_3Si(CH_2)_2CO$—
$(CH_3O)_3Si(CH_2)_3CO$—
$(CH_3O)_3Si(CH_2)_2$—
$(C_2H_5O)_3Si(CH_2)_2$—
$(C_6H_5O)_3Si(CH_2)_2$—
$(CH_3O)_3Si(CH_2)_3$—
$(C_2H_5O)_3Si(CH_2)_3$—
$(C_6H_5O)_3Si(CH_2)_3$—
$(CH_3O)_3Si(CH_2)_4$—
$(C_2H_5O)_3Si(CH_2)_4$—
$(C_6H_5O)_3Si(CH_2)_4$—
$(C_2H_5O)_2CH_3Si(CH_2)_3NHCO$—
$(CH_3O)_2CH_3i(CH_2)_3NHCO$—
$(C_2H_5O)_2CH_3Si(CH_2)_4NHCO$—
$(CH_3O)_2CH_3Si(CH_2)_4NHCO$—
$(C_6H_5O)_2CH_3Si(CH_2)_3NHCO$—
$(C_6H_5O)_2CH_3Si(CH_2)_4NHCO$—
$(C_2H_5O)_2CH_3Si(CH_2)_5NHCO$—
$(C_2H_5O)_2CH_3Si(CH_2)_2CO$—
$(C_2H_5O)_2CH_3Si(CH_2)_3CO$—
$(CH_3O)_2CH_3Si(CH_2)_2CO$—
$(CH_3O)_2CH_3Si(CH_2)_3CO$—
$(CH_3O)_2CH_3Si(CH_2)_2$—
$(C_2H_5O)_2CH_3Si(CH_2)_2$—
$(C_6H_5O)_2CH_3Si(CH_2)_2$—
$(CH_3O)_2CH_3Si(CH_2)_3$—
$(CH_3O)_2CH_3Si(CH_2)_4$—
$(C_2H_5O)_2CH_3Si(CH_2)_3$—
$(C_6H_5O)_2CH_3Si(CH_2)_3$—
$(C_2H_5O)_2C_6H_5Si(CH_2)_3NHCO$—
$(CH_3O)_2C_6H_5Si(CH_2)_3NHCO$—
$(C_2H_5O)_2C_6H_5Si(CH_2)_4NHCO$—
$(CH_3O)_2C_6H_5Si(CH_2)_4NHCO$—
$(C_6H_5O)_2C_6H_5Si(CH_2)_3NHCO$—
$(C_6H_5O)_2C_6H_5Si(CH_2)_4NHCO$—
$(C_2H_5O)_2C_6H_5Si(CH_2)_5NHCO$—
$(C_2H_5O)_2C_6H_5Si(CH_2)_2CO$—
$(C_2H_5O)_2C_6H_5Si(CH_2)_3CO$—
$(CH_3O)_2C_6H_5Si(CH_2)_2CO$—
$(CH_3O)_2C_6H_5Si(CH_2)_3CO$—
$(CH_3O)_2C_6H_5Si(CH_2)_2$—
$(C_2H_5O)_2C_6H_5Si(CH_2)_2$—
$(C_6H_5O)_2C_6H_5Si(CH_2)_2$—
$(CH_3O)_2C_6H_5Si(CH_2)_3$—
$(C_2H_5O)_2C_6H_5Si(CH_2)_3$—
$(C_6H_5O)_2C_6H_5Si(CH_2)_3$—

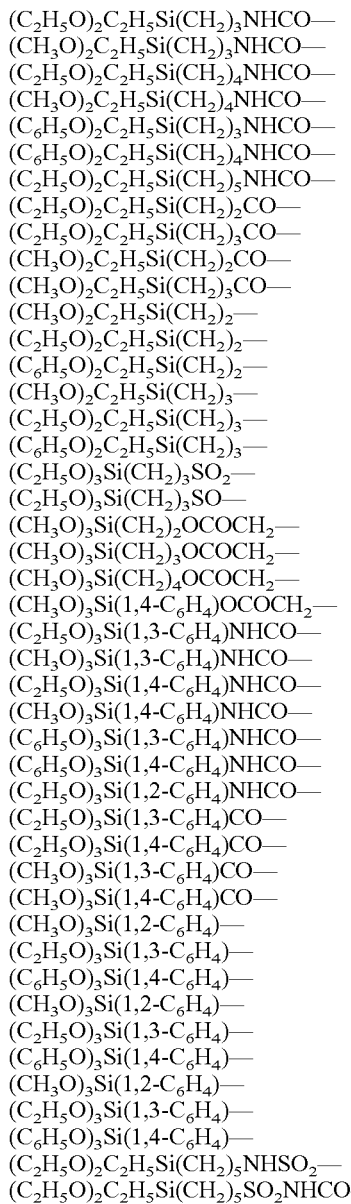

The degree of substitution Z of the group represented by Formula (1) is preferably in the range of 0.001 to 1.5, more preferably 0.05 to 1.0, and particularly preferably 0.1 to 0.6.

In the present invention, the sum total of the degrees of substitution, that is, X+Y+Z, is preferably at least 2.65 but no greater than 2.96, and particularly preferably at least 2.75 but no greater than 2.95.

In the present invention, the degree of substitution at each of the 2-, 3-, and 6-positions of the cellulose is not particularly limited.

In the present invention, two or more different types of cellulose derivatives may be mixed or used singly in different layers so as to form a film.

A method for synthesizing the cellulose derivative of the present invention may preferably employ the above-mentioned synthetic method for a cellulose acylate.

Furthermore, the cellulose derivative of the present invention may be produced using any known standard method for modifying a hydroxyl group, and a method in which a remaining OH group of the cellulose derivative is modified so as to introduce a group represented by Formula (1), or a method in which, after a group represented by Formula (1) is first introduced into cellulose, a group corresponding to at least one of acetyl or an acyl group other than acetyl is introduced, is preferably used.

That is, synthesis can be carried out by combining a method in which a remaining hydroxyl group of a cellulose derivative and an isocyanato compound are reacted using a metal catalyst such as dibutyltin laurate, a method in which a reaction is carried out using an acid halide and an appropriate base catalyst, a method in which a reaction is carried out using an acid anhydride and an acid catalyst or base catalyst, a method in which a reaction of an epoxy or an oxetane compound is carried out using an acid catalyst or a Lewis acid catalyst, a method in which a reaction is carried out in the presence of an alkyl halide compound and a base, a method in which an alkali cellulose and an alkyl halide or an epoxy compound such as ethylene oxide or propylene oxide are reacted, and a method in which an alkali cellulose and an α-halocarbonyl compound are reacted.

Prior to such derivatization of cellulose, a treatment with an aqueous solution of sodium hydroxide, a so-called mercerization treatment, a treatment in which cellulose is dissolved in a solvent such as lithium chloride/dimethylacetamide and a regenerated cellulose is obtained from the solution, a pretreatment with liquid ammonia, a pretreatment with hot water, steam, or an acid may be carried out for the purpose of, for example, activation.

Preferred ranges for the degree of polymerization and the water content of the cellulose derivative preferably used in the present invention are the same as the preferred ranges of the degree of polymerization and the water content of the above-mentioned cellulose acylate.

The cellulose derivative film of the present invention is preferably formed from a cellulose derivative having polymer components that substantially satisfy the above-mentioned definition. 'Substantially' here means at least 55 wt % of the polymer components (preferably at least 70 wt %, and more preferably at least 80 wt %). With regard to a starting material for production of the film, the cellulose derivative is preferably in the form of particles or a powder. When the cellulose derivative is in the form of particles, it is preferable that at least 90 wt % of the particles used have a particle size of 0.5 to 5 mm. It is also preferable that at least 50 wt % of the particles used have a particle size of 1 to 4 mm. The cellulose derivative particles preferably have a shape that is as close to spherical as possible.

The hydrolyzable and polycondensable reactive metal compound b) and the solvent d) used in the cellulose derivative dope composition of the present invention are preferably a reactive metal compound and a solvent that are preferably used in the above-mentioned cellulose acylate film.

Furthermore, the cellulose derivative can be prepared by the same method as that used for preparation of the above-mentioned cellulose acylate.

Metal Chelate Compound for Hydrolysis and Polycondensation of Reactive Metal Compound c)

In the cellulose derivative dope composition of the present invention, for the purpose of promoting a hydrolysis-partial condensation reaction of a reactive metal compound, a metal chelate compound is used. Preferred examples thereof are compounds listed in the above-mentioned (b3), and a preferred compound selected therefrom is used in a necessary amount. In addition, various types of catalyst compounds such as organotransition metal compounds may be used in combination with the metal chelate compound. Preferred examples of the organotransition metal compounds are compounds listed in the above-mentioned (b4).

Two or more types of compounds appropriately selected from this group of compounds (b3) and (b4) can be used in combination in such a range that they do not interfere with each other's promotion effect.

Furthermore, in the present invention, any compound represented by the group of compounds (b1), (b2), and (b5) may be used in combination with the catalyst of (b3) or (b4) in such a range that the activity is not affected.

The proportion of the sol/gel catalyst compound in the composition, the removal of the catalyst, and the amount of water added for the hydrolysis-condensation reaction of the reactive metal compound are the same as those for the case of the above-mentioned cellulose acylate film.

It is also preferable to use a compound having the ability to coordinate as a chelate, which is described above.

In the present invention, the cellulose derivative film, which comprises the cellulose derivative satisfying a specific degree of substitution and a hydrolysis-condensation product of a hydrolyzable and polycondensable reactive metal compound, exhibits little humidity dependence of the retardation, and although the detailed reason is not clear, it is surmised to be as follows.

That is, it is surmised that forming a polymer or a structure of the reactive metal compound in the cellulose derivative film enables expansion of the film due to moisture absorption to be suppressed, and as a result the change in retardation with changes in humidity is reduced. It is also surmised that, when a cellulose derivative having a total degree of substitution of less than 2.5 is used, the cellulose derivative itself has high hydrophilicity, and even if a polymer or a structure of the reactive metal compound is formed, the effect cannot be exhibited sufficiently.

A solution (dope composition) of a cellulose derivative of the present invention can be prepared by the same method as that used for the preparation of the above-mentioned cellulose acylate solution.

The proportions of the cellulose derivative and the organic solvent in the cellulose derivative dope composition of the present invention are preferably the same as those of the cellulose acylate and the organic solvent in the above-mentioned cellulose acylate solution. Furthermore, the method for adjusting the cellulose derivative to these concentrations is the same as that used for the above-mentioned cellulose acylate solution.

With regard to a process for producing an optical film (hereinafter, also called a 'cellulose derivative film') using the cellulose derivative dope composition of the present invention, the process for producing the above-mentioned cellulose acylate film can preferably be used. The cellulose derivative film of the present invention can be used suitably in the same applications as those for the cellulose acylate film.

In accordance with the present invention, a novel cellulose acylate film is produced that has improved display unevenness in the environment used when it is incorporated into a liquid crystal display device.

EXAMPLES

Specific modes for carrying out the present invention are explained below with reference to examples, but the present invention is not limited to these examples.

Example 1

Cellulose acylate films were formed by the following steps (1) to (3).

(1) Preparation of Cellulose Acylate

Cellulose acylates were prepared so as to have the type of acyl group and the degree of substitution described in Table 1. Cellulose acylates having different types of acyl group and substitution ratios were prepared by carrying out an acylation reaction at 0° C. to −40° C. using cellulose, a carboxylic acid anhydride, sulfuric acid as a catalyst, and a carboxylic acid as a solvent while adjusting the type and amount of carboxylic acid anhydride. The total degree of substitution was adjusted by aging conditions (time and temperature) after the acylation.

The cellulose acylates thus obtained were subjected to measurement of the total degree of acylation in accordance with a measurement method for degree of acetylation described in ASTM: D-817-91 (test method for cellulose acetate, etc.). The ratio of substitution by acetyl and acyl groups other than acetyl was also measured by $^{13}$C-NMR (complete proton decoupling, quantitative mode). The results thereof are given in Table 1.

(2) Dissolution of Cellulose Acylate (a) Solvent

Selected from the solvents below, and shown in Table 1.

Non-chlorinated (1): methyl acetate/acetone/methanol/ethanol/butanol (80/5/7/5/3, parts by weight)

Non-chlorinated (2): methyl acetate/ethanol (300/45, parts by weight)

Chlorinated: dichloromethane/methanol/ethanol/butanol (85/6/5/4, parts by weight)

(b) Cellulose Acylate Solution

The water content was reduced to 0.5% or below by blow drying, and the cellulose acylates shown in Table 1 were adjusted to 25 wt % relative to the solvent so as to give cellulose acylate solutions (dopes).

(c) Additives

The additives below were added to the above-mentioned dope.

Plasticizer A: triphenyl phosphate (3 wt %)

Plasticizer B: biphenyldiphenyl phosphate (1 wt %)

UV AGENT a: 2,4-bis-(n-octylthio)-6-(4-hydroxy-3,5-di-tert-butylanilino)-1,3,5-triazine (0.5wt%)

UV AGENT b: 2-(2'-hydroxy-3',5'-di-tert-butylphenyl)-5-chlorobenzotriazole (0.2 wt %)

UV AGENT c: 2-(2'-hydroxy-3',5'-di-tert-amylphenyl)-5-chlorobenzotriazole (0.1 wt %)

Ethyl citrate (1:1 mixture of monoester and diester, 0.2 wt %)

The amounts added (wt %) are all proportions relative to the cellulose acylate.

(d) Swelling and Dissolution

The cellulose acylate, and additives were poured into the solvent while stirring. After completion of the pouring, the stirring was stopped, and swelling was carried out at 25° C. for 3 hours to give a slurry. This was again stirred, thus dissolving the cellulose acylate completely.

(e) Addition of Reactive Metal Compound, Water, and Catalyst

A reactive metal compound, water, and a catalyst were added to the above-mentioned cellulose acylate solution, and the mixture was stirred at 40° C. for 4 hours. The types and amounts are shown in Table 1. The amounts (wt %) of reactive metal compound added described in the table are all proportions relative to the cellulose acylate. The amounts of water and catalyst added described in the table are equivalents relative to the alkoxy group of the reactive metal compound.

A) Reactive Metal Compound

A-1 Tetraethoxysilane

A-2 Methyltrimethoxysilane

A-3 Phenyltrimethoxysilane

A-4 Hexyltrimethoxysilane

A-5 Dimethyidimethoxysilane

B) Catalyst
  B-1 Hydrochloric acid
  B-2 Acetic acid
  B-3 (Ethyl acetoacetato) aluminum diisopropoxide (f) Filtration and Concentration Filtration was subsequently carried out using a filter paper having an absolute filtration accuracy of 0.01 mm (#63; manufactured by Toyo Roshi Kaisha, Ltd.), and further using a filter paper having an absolute filtration accuracy of 2.5 μm (FH025; manufactured by Pall Corp.).

(3) Formation of Undrawn Film

The above-mentioned dope was heated at 35° C. and cast by either one of the methods below (see Table 1).

(a) Band Method

The dope was cast through a geyser onto a mirror-finished stainless steel support having a band length of 60 m and set at 15° C. The geyser used was one having a shape similar to that described in JP-A-11-314233. The casting speed was 60 m/minute and the casting width was 250 cm.

The film was released while the residual solvent was 100 wt %, it was (gradually) heated from 40° C. to 120° C., and then dried at 120° C. for 5 minutes, and further at 145° C. for 20 minutes to give a cellulose triacylate film. The film thus obtained was trimmed at either edge by 3 cm, sections of 2 to 10 mm from either edge were provided with a knurling having a height of 100 μm, and a 3,000 m length of the film was wound up as a roll.

(b) Drum Method

The dope was cast through a geyser onto a mirror-finished stainless steel drum having a diameter of 3 m and set at −15° C. The geyser used was one having a shape similar to that described in JP-A-11-314233. The casting speed was 100 m/minute and the casting width was 250 cm.

The film was released while the residual solvent was 200 wt %, it was heated (gradually) from 40° C. to 120° C., then dried at 120° C. for 5 minutes, further at 145° C. for 20 minutes, and gradually cooled to give a cellulose triacylate film. The film thus obtained was trimmed at either edge by 3 cm, sections of 2 to 10 mm from either edge were provided with a knurling having a height of 100 μm, and a 3,000 m length of the film was wound up as a roll.

(4) Evaluation of Characteristics of Undrawn Film

Changes in Re and Rth accompanying environmental change between 25° C./10% RH and 25° C./80% RH were measured by the above-mentioned method, and are given in Table 1.

TABLE 1

| Sample No. | Degree of substitution by acetyl | Degree of substitution by other acyl groups | Solvent | Metal compound | Amount added | Amount of water added (equivalents) | Catalyst | Film formation method | Change with humidity Re (nm) | Change with humidity Rth (nm) | Notes |
|---|---|---|---|---|---|---|---|---|---|---|---|
| 1 | 2.41 | None | Chlorinated | A-1 | 34.70% | 1.2 | B-1 1% | Band method | 38 | 150 | Comp. Ex. |
| 2 | 1.75 | $C_3H_7CO = 0.6$ | Non-chlorinated (1) | A-2 | 22.70% | 1.4 | B-2 1% | Band method | 32 | 135 | Comp. Ex. |
| 3 | 2.6 | $C_3H_7CO = 0.21$ | Non-chlorinated (1) | None | None | None | None | Band method | 18 | 85 | Comp. Ex. |
| 4 | 2.2 | $C_3H_7CO = 0.6$ | Non-chlorinated (1) | None | None | None | None | Band method | 17 | 80 | Comp. Ex. |
| 5 | 2.6 | $C_3H_7CO = 0.21$ | Non-chlorinated (1) | A-1 | 34.70% | 1.2 | B-1 1% | Band method | 9 | 30 | Invention |
| 6 | 2.2 | $C_3H_7CO = 0.6$ | Non-chlorinated (1) | A-2 | 22.70% | 1.4 | B-2 1% | Band method | 7 | 25 | Invention |
| 7 | 2.2 | $C_4H_9CO = 0.6$ | Non-chlorinated (1) | A-1 | 34.70% | 1.4 | B-3 1% | Band method | 5 | 10 | Invention |
| 8 | 1.95 | $C_4H_9CO = 0.85$ | Non-chlorinated (1) | A-2 | 22.70% | 1.4 | B-1 1% | Band method | 8 | 12 | Invention |
| 9 | 1.7 | $C_4H_9CO = 1.1$ | Non-chlorinated (1) | A-1 | 34.70% | 1.4 | B-2 1% | Band method | 7 | 25 | Invention |
| 10 | 1.1 | $C_4H_9CO = 1.72$ | Non-chlorinated (1) | A-4 | 34.30% | 1.4 | B-3 1% | Band method | 5 | 20 | Invention |
| 11 | 2.6 | $C_3H_7CO = 0.21$ | Chlorinated | A-1 | 34.70% | 1.2 | B-1 1% | Band method | 11 | 10 | Invention |
| 12 | 2.6 | $C_4H_9CO = 0.21$ | Chlorinated | A-2 | 22.70% | 1.2 | B-2 1% | Band method | 10 | 15 | Invention |
| 13 | 2.85 | None | Chlorinated | A-1 | 34.70% | 1.2 | B-3 1% | Drum method | 4 | 12 | Invention |
| 14 | 1.7 | $C_4H_9CO = 1.1$ | Chlorinated | A-2 | 22.70% | 1.2 | B-1 1% | Drum method | 6 | 13 | Invention |
| 15 | 2.2 | $C_3H_7CO = 0.6$ | Chlorinated | A-1 | 34.70% | 1.2 | B-2 1% | Drum method | 3 | 15 | Invention |
| 16 | 1.75 | $C_3H_7CO = 1.1$ | Non-chlorinated (2) | A-2 | 22.70% | 1.3 | B-3 1% | Band method | 5 | 12 | Invention |
| 17 | 2.6 | $C_3H_7CO = 0.21$ | Non-chlorinated (2) | A-1 | 34.70% | 1.3 | B-1 1% | Band method | 10 | 20 | Invention |
| 18 | 2.2 | $C_3H_7CO = 0.6$ | Non-chlorinated (2) | A-2 | 22.70% | 1.3 | B-2 1% | Band method | 3 | 21 | Invention |
| 19 | 2.2 | $C_4H_9CO = 0.6$ | Non-chlorinated (2) | A-1 | 34.70% | 1.3 | B-3 1% | Band method | 7 | 20 | Invention |
| 20 | 1.95 | $C_4H_9CO = 0.85$ | Non-chlorinated (2) | A-2 | 22.70% | 1.3 | B-1 1% | Band method | 9 | 18 | Invention |
| 22 | 1.7 | $C_4H_9CO = 1.1$ | Non-chlorinated (2) | A-3 | 33% | 1.3 | B-2 1% | Band method | 6 | 23 | Invention |
| 23 | 1.1 | $C_4H_9CO = 1.72$ | Non-chlorinated (2) | A-5 | 20.00% | 1.3 | B-3 1% | Band method | 6 | 12 | Invention |

Films of Sample Nos. 1 and 2, which were formed using a cellulose acylate having a degree of acylation of less than 2.5 and falling outside the scope of the present invention, showed large changes in retardation with humidity, even in combination with the reactive metal compound of the present invention. Even for films prepared using a cellulose acylate having a degree of acylation of 2.5 or greater, when the reactive metal compound of the present invention was not added, the change in retardation was large for both Re and Rth, and a good optical film could not be obtained.

On the other hand, a film of the present invention formed by the combination of a cellulose acylate having a degree of acylation of 2.5 or higher and a reactive metal compound of the present invention exhibited good characteristics.

Example 2

Undrawn films Nos. 1 to 23 of Example 1 were drawn with 50% MD drawing at 100%/sec and 50% TD drawing at 20%/sec at a temperature that was 10° C. higher than the Tg of the corresponding cellulose acylate film. As the drawing method, simultaneous biaxial drawing, in which machine and transverse directions are drawn at the same time, was carried out, and when Re, Rth, and the humidity dependence thereof were measured by the same method as that of Example 1, the films of the present invention exhibited good characteristics.

Furthermore, other than the above-mentioned method in which drawing was carried out after film formation and drying, drawing was also carried out in an undried state during film formation (immediately after completion of the gradual heating subsequent to releasing), and these films of the present invention similarly exhibited good characteristics.

Example 3

Formation of polarizing plates and evaluation of the characteristics thereof were carried out as follows.

(1) Saponification of Cellulose Acylate Film

Saponification of an undrawn or drawn cellulose acylate film was carried out by either one of the methods below as shown in Table 2.

(a) Coating Saponification 20 parts by weight of water was added to 80 parts by weight of isopropyl alcohol, potassium hydroxide was dissolved therein to give a 1.5 N solution, the temperature of the mixture was adjusted to 60° C., and this was used as a saponification liquid. This was applied to a cellulose acylate film kept at 60° C. with a coat weight of 10 g/m$^2$, and saponification was carried out for 1 minute.

Subsequently, hot water at 50° C. was sprayed on using a spray at 10 L/m$^2$•min for 1 minute.

(b) Immersion Saponification

A 1.5 N aqueous solution of sodium hydroxide was used as a saponification liquid.

The temperature thereof was adjusted to 60° C., and a cellulose acylate film was immersed therein for 2 minutes.

Subsequently, the film was immersed in a 0.1 N aqueous solution of sulfuric acid for 30 sec, and then passed through a water bath.

(2) Preparation of Polarizing Layer

In accordance with Example 1 of JP-A-2001-141926, a difference in peripheral speed was imparted to two pairs of nip rollers, thus drawing in the longitudinal direction and giving a 20 μm thick polarizing layer.

(3) Bonding

The polarizing layer thus obtained was sandwiched between two films selected from the above-mentioned saponified undrawn or drawn cellulose acylate films and bonded using a 3% aqueous solution of PVA (PVA-117H; manufactured by Kuraray Co., Ltd.) as an adhesive so that the angle between the axis of polarization and the longitudinal direction of the cellulose acylate film was 90 degrees. The undrawn or drawn cellulose acylate film was mounted on a 20 inch VA type liquid crystal display device described in FIGS. 2 to 9 of JP-A-2000-154261 at 25° C. and 60% RH, this was then brought into 25° C. and 10% RH, the change in color was evaluated visually according to 10 grades (the higher the grade, the greater the change), the area where display unevenness occurred was visually evaluated, and the proportion (%) of the area where occurred is given in Table 2. The display device to which the present invention applied exhibited good performance.

In accordance with Example 1 of JP-A-2002-86554, a polarizing plate drawn using a tenter to give a drawing axis with an inclination of 45 degrees was formed in the same manner using the cellulose acylate film of the present invention, and the same good results as above were obtained.

TABLE 2

|  | Film Sample No. |  | Film Sample No. | Saponification | Color change | Display unevenness (%) | Notes |
| --- | --- | --- | --- | --- | --- | --- | --- |
| Polarizing plate 1 | Drawn | 5 | Undrawn | 5 Coating | 1 | 0 | Invention |
| Polarizing plate 2 | Drawn | 6 | Drawn | 5 Coating | 1 | 0 | " |
| Polarizing plate 3 | Undrawn | 5 | Undrawn | 5 Coating | 1 | 0 | " |
| Polarizing plate 4 | Drawn | 7 | Undrawn | 5 Coating | 1 | 0 | " |
| Polarizing plate 5 | Drawn | 8 | Undrawn | 5 Coating | 1 | 0 | " |
| Polarizing plate 6 | Drawn | 9 | Undrawn | 5 Coating | 1 | 0 | " |
| Polarizing plate 7 | Drawn | 10 | Undrawn | 5 Coating | 1 | 0 | " |
| Polarizing plate 8 | Drawn | 11 | Undrawn | 5 Coating | 1 | 0 | " |
| Polarizing plate 9 | Drawn | 12 | Undrawn | 12 Immersion | 1 | 0 | " |
| Polarizing plate 10 | Drawn | 13 | Undrawn | 13 Immersion | 1 | 0 | " |
| Polarizing plate 11 | Drawn | 5 | Undrawn | 5 Immersion | 2 | 3 | " |
| Polarizing plate 12 | Drawn | 5 | Undrawn | 5 Immersion | 2 | 3 | " |
| Polarizing plate 13 | Undrawn | 1 | Undrawn | 1 Coating | 10 | 36 | Comp. Ex. |
| Polarizing plate 14 | Undrawn | 2 | Undrawn | 2 Coating | 10 | 39 | " |

Example 4

Formation and evaluation of optical compensation films were carried out.

Instead of the cellulose acetate film coated with a liquid crystal layer of Example 1 of JP-A-11-316378, a saponified drawn cellulose acylate film of the present invention was used, and this was mounted on a bend alignment liquid crystal cell of Example 9 of JP-A-2002-62431 at 25° C. and 60%RH, then brought into 25° C. and 10% RH, the change in contrast was visually evaluated, and the degree of change in color was evaluated according to 10 grades (the higher the grade, the greater the change) as shown in Table 3. Those to which the present invention was applied exhibited excellent performance.

TABLE 3

|  | Film sample No. |  | Contrast change | Notes |
| --- | --- | --- | --- | --- |
| Optical compensation 1 | Drawn | 5 | 1 | Invention |
| Optical compensation 2 | " | 6 | 1 | " |
| Optical compensation 3 | " | 7 | 1 | " |
| Optical compensation 4 | " | 8 | 1 | " |
| Optical compensation 5 | " | 9 | 1 | " |
| Optical compensation 6 | " | 10 | 1 | " |
| Optical compensation 7 | " | 11 | 1 | " |
| Optical compensation 8 | " | 12 | 2 | " |
| Optical compensation 9 | " | 13 | 2 | " |
| Optical compensation 10 | " | 1 | 10 | Comp. Ex. |
| Optical compensation 11 | " | 2 | 10 | " |

Furthermore, with regard to the cellulose acylate film of the present invention, a low reflection film was prepared using a drawn or undrawn cellulose acylate film of the present invention in accordance with Example 47 of 'Hatsumei Kyokai Koukai Giho' (Journal of Technical Disclosure) (Technical Disclosure No. 2001-1745, Japan Institute of Invention and Innovation), and excellent optical performance was achieved.

Example 5

1. Formation of Cellulose Acylate Films (1) Preparation of Cellulose Acylate

The procedure of (1) preparation of cellulose acylate of Example 1 was repeated except that cellulose acylates having different types of acyl groups and different degrees of substitution as shown in Table 4 were prepared.

(2) Dissolution of Cellulose Acylate (a) Solvent

Selected from the solvents below as shown in Table 4.

Non-chlorinated: methyl acetate/acetone/methanol/ethanol/butanol (80/5/7/5/3 parts by weight)

Chlorinated: dichloromethane/methanol/ethanol/butanol (85/6/5/4 parts by weight)

With regard to (b) cellulose acylate solution, (c) additive, and (d) swelling and dissolution, the procedures of (b) to (d) of (2) of Example 1 were repeated except that the cellulose acylates shown in Table 4 were used.

(5) Addition of Oligomeric Reactive Metal Compound, Water, and Catalyst

An oligomeric reactive metal compound, water, and a catalyst were added to the above-mentioned cellulose acylate solution, and stirred at 40° C. for 4 hours. The types and amount are shown in Table 4. The amounts of reactive metal compound added (wt %) shown in the table are all proportions relative to the cellulose acylate. The amounts of water and catalyst added shown in the Table are equivalents relative to the alkoxy group of the oligomeric reactive metal compound.

A) Oligomeric Reactive Metal Compound

A-1: 1,3,5,7-Tetraethoxy-1,3,5,7-tetramethylcyclotetrasiloxane (manufactured by Shin-Etsu Chemical Co., Ltd. )

A-2: 1,3,5,7,9-Pentaethoxy-1,3,5,7,9-pentamethylcyclopentasiloxane (manufactured by Shin-Etsu Chemical Co., Ltd.)

A-3: Polymethoxysiloxane (M silicate 51 (manufactured by Tama Chemicals Co., Ltd.) average degree of polymerization 4)

A4: Polymethoxysiloxane (methyl silicate 51 (manufactured by Colcoat Co., Ltd.) average degree of polymerization 3)

A-5: Polymethoxysiloxane (average degree of polymerization 7)

A-6: Polyethoxysiloxane (average degree of polymerization 7)

B) Catalyst

B-1: Hydrochloric acid (Wako Pure Chemical Industries, Ltd., 1N)

B-2: (Ethyl acetoacetato) aluminum diisopropoxide (Wako Pure Chemical Industries, Ltd.)

(6) Filtration and Concentration

Filtration was subsequently carried out with a filter paper having an absolute filtration accuracy of 0.01 mm (#63; manufactured by Toyo Roshi Kaisha, Ltd.), and further with a filter paper having an absolute filtration accuracy of 2.5 μm (FH025; manufactured by Pall Corp.).

(3) Formation of Undrawn Film

Either the band method (a) or the drum method (b) described in (3) of Example 1 was employed as shown in Table 4.

(4) Evaluation of Characteristics of Undrawn Film

Changes in Re and Rth accompanying environmental change between 25° C./10% RH and 25° C./80% RH were measured by the above-mentioned method, and are given in Table 4.

Furthermore, Samples 28 and 29 were subjected to measurement of light transmittance using a spectrophotometer (UV-3100PC; manufactured by Shimadzu Corporation).

The materials, the method of formation, and the evaluation results of the cellulose acylate films are shown in Table 4.

TABLE 4

| Sample No. | Degree of substitution by acetyl | Degree of substitution by other acyl groups | Solvent | Oligomer | Amount added % |
|---|---|---|---|---|---|
| 24 | 1.55 | None | Chlorinated | A-1 | 17.60% |
| 25 | 1.6 | None | Non-chlorinated | A-2 | 28.40% |
| 26 | 2.6 | $C_3H_7CO = 0.19$ | Non-chlorinated | None | None |
| 27 | 2.2 | $C_3H_7CO = 0.62$ | Non-chlorinated | None | None |
| 28* | 1.8 | None | Non-chlorinated | Tetramethoxysilane | 23.77% |
| 29** | 1.8 | None | Non-chlorinated | A-3 | 16.50% |
| 30 | 2.2 | $C_3H_7CO = 0.6$ | Non-chlorinated | A-2 | 28.40% |
| 31 | 2.2 | $C_4H_9CO = 0.6$ | Non-chlorinated | A-3 | 16.50% |
| 32 | 1.95 | $C_4H_9CO = 0.85$ | Non-chlorinated | A-4 | 21.80% |
| 33 | 1.7 | $C_4H_9CO = 1.1$ | Non-chlorinated | A-5 | 16.00% |
| 34 | 1.1 | $C_4H_9CO = 1.72$ | Non-chlorinated | A-6 | 21.20% |
| 35 | 2.6 | $C_3H_7CO = 0.21$ | Chlorinated | A-1 | 34.70% |
| 36 | 2.6 | $C_4H_9CO = 0.21$ | Chlorinated | A-2 | 22.70% |
| 37 | 2.83 | None | Chlorinated | A-1 | 17.60% |
| 38 | 1.7 | $C_4H_9CO = 1.1$ | Chlorinated | A-2 | 28.40% |
| 39 | 2.2 | $C_3H_7CO = 0.6$ | Chlorinated | A-1 | 17.60% |
| 40 | 1.75 | $C_3H_7CO = 1.1$ | Chlorinated | A-2 | 28.40% |
| 41 | 2.6 | $C_3H_7CO = 0.21$ | Chlorinated | A-1 | 17.60% |
| 42 | 2.2 | $C_3H_7CO = 0.6$ | Chlorinated | A-2 | 28.40% |

TABLE 4-continued

| | | | | | | |
|---|---|---|---|---|---|---|
| 43 | 2.2 | $C_4H_9CO = 0.6$ | Chlorinated | A-1 | | 17.60% |
| 44 | 1.95 | $C_4H_9CO = 0.85$ | Chlorinated | A-2 | | 28.40% |
| 45 | 1.7 | $C_4H_9CO = 1.1$ | Chlorinated | A-3 | | 16.50% |
| 46 | 1.1 | $C_4H_9CO = 1.72$ | Chlorinated | A-4 | | 21.80% |

| Sample No. | Amount of water added (equivalents) | Catalyst | Film formation method | Change with humidity Re (nm) | Change with humidity Rth (nm) | Notes |
|---|---|---|---|---|---|---|
| 24 | 1.2 | B-1 1% | Band method | Difficult to form film | Difficult to form coating | Comp. Ex. |
| 25 | 1.2 | B-2 1% | Band method | Difficult to form film | Difficult to form coating | Comp. Ex. |
| 26 | None | None | Band method | 18 | 85 | Comp. Ex. |
| 27 | None | None | Band method | 17 | 80 | Comp. Ex. |
| 28* | 1.2 | B-1 1% | Band method | 15 | 38 | Comp. Ex. |
| 29** | 1.2 | B-1 1% | Band method | 11 | 32 | Ref. Ex. |
| 30 | 1.2 | B-2 1% | Band method | 7 | 20 | Invention |
| 31 | 1.2 | B-2 1% | Band method | 4 | 14 | Invention |
| 32 | 1.2 | B-1 1% | Band method | 7 | 13 | Invention |
| 33 | 1.2 | B-2 1% | Drum method | 5 | 23 | Invention |
| 34 | 1.2 | B-2 1% | Drum method | 3 | 18 | Invention |
| 35 | 1.1 | B-1 1% | Band method | 9 | 10 | Invention |
| 36 | 1 | B-2 1% | Band method | 5 | 19 | Invention |
| 37 | 1 | B-2 1% | Drum method | 2 | 17 | Invention |
| 38 | 1.1 | B-1 1% | Drum method | 3 | 18 | Invention |
| 39 | 1.2 | B-2 1% | Drum method | 1 | 20 | Invention |
| 40 | 1.3 | B-2 1% | Band method | 3 | 22 | Invention |
| 41 | 1.3 | B-2 1% | Band method | 6 | 16 | Invention |
| 42 | 1.3 | B-2 1% | Band method | 3 | 19 | Invention |
| 43 | 1.1 | B-2 1% | Band method | 5 | 14 | Invention |
| 44 | 1.1 | B-2 1% | Band method | 5 | 22 | Invention |
| 45 | 1.1 | B-2 1% | Band method | 4 | 14 | Invention |
| 46 | 1.2 | B-2 1% | Band method | 3 | 19 | Invention |

*Light transmittance 81%, light transmittance 92%

It was difficult to form a film using a cellulose acylate having a degree of acylation of less than 2.5, which falls outside the scope of the present invention (Sample Nos. 24 and 25). Even for a film prepared using a cellulose acylate having a degree of acylation of 2.5 or greater, when it was not combined with an oligomeric reactive metal compound of the present invention, there was a large change in retardation for both Re and Rth, and a good optical film could not be obtained. On the other hand, a film of the present invention formed by the combination of a cellulose acylate having a degree of acylation of 2.5 or greater and an oligomeric reactive metal compound of the present invention exhibited good characteristics.

Furthermore, when Comparative Sample 28 and Reference Sample 29 were compared, although the silicon contents of these samples were substantially the same, it was found that Reference Sample 29 gave a film having higher light transmittance.

Example 6

The undrawn films of Example 5 were drawn with 50% MD drawing at 100%/sec and 50% TD drawing at 20%/sec at a temperature that was 10° C. higher than the Tg of the corresponding cellulose acylate film. As the drawing method, simultaneous biaxial drawing, in which drawing is carried out at the same time in machine and transverse directions, was carried out, and when Re, Rth, and the humidity dependence thereof were measured by the same method as that of Example 5, the films of the present invention exhibited good characteristics.

Furthermore, other than the above-mentioned method in which drawing was carried out after film formation and drying, drawing was also carried out in an undried state during film formation (immediately after completion of the gradual heating subsequent to releasing), and the films of the present invention similarly exhibited good characteristics.

Example 7

Formation and evaluation of the characteristics of polarizing plates were carried out by the same method as in Example 3 using the samples and the saponification method described in Table 5. With regard to the polarizing plates thus obtained, the change in color and display unevenness were evaluated, and the results are given in Table 5.

Those to which the present invention was applied exhibited excellent performance.

A polarizing plate was formed using the cellulose acylate film of the present invention by drawing in accordance with Example 1 of JP-A-2002-86554 with a tenter so that the inclination of the drawing axis was 45 degrees, and the same excellent results as above were obtained.

The saponification method for the cellulose acylate films and the evaluation results of the polarizing plates formed are shown in Table 5.

TABLE 5

| | Cellulose acylate film | | | | Saponification | | Color change | Display unevenness (%) | Notes |
|---|---|---|---|---|---|---|---|---|---|
| Polarizing plate 15 | Drawn | 37 | Undrawn | 37 | Coating | | 1 | 0 | Invention |
| Polarizing plate 16 | Drawn | 31 | Drawn | 37 | Coating | | 1 | 0 | " |
| Polarizing plate 17 | Undrawn | 37 | Undrawn | 37 | Coating | | 1 | 0 | " |
| Polarizing plate 18 | Drawn | 30 | Undrawn | 37 | Coating | | 1 | 0 | " |
| Polarizing plate 19 | Drawn | 38 | Undrawn | 37 | Coating | | 1 | 1 | " |
| Polarizing plate 20 | Drawn | 32 | Undrawn | 37 | Coating | | 1 | 0 | " |
| Polarizing plate 21 | Drawn | 33 | Undrawn | 37 | Coating | | 1 | 0 | " |
| Polarizing plate 22 | Drawn | 34 | Undrawn | 37 | Coating | | 1 | 0 | " |
| Polarizing plate 23 | Drawn | 35 | Undrawn | 35 | Immersion | | 2 | 1 | " |
| Polarizing plate 24 | Drawn | 36 | Undrawn | 36 | Immersion | | 1 | 0 | " |
| Polarizing plate 25 | Drawn | 37 | Undrawn | 37 | Immersion | | 1 | 1 | " |
| Polarizing plate 26 | Drawn | 37 | Undrawn | 37 | Immersion | | 1 | 0 | " |
| Polarizing plate 27 | Undrawn | 26 | Undrawn | 26 | Coating | | 8 | 33 | Comp. Ex. |
| Polarizing plate 28 | Undrawn | 27 | Undrawn | 27 | Coating | | 8 | 30 | " |

Example 8

Preparation and evaluation of optical compensation films were carried out by the same method as in Example 4. The samples used and the evaluation results of change in the contrast of the optical compensation films obtained are given in Table 6.

Those to which the present invention was applied exhibited excellent performance.

TABLE 6

| | Cellulose acylate film | | Change in contrast | Notes |
|---|---|---|---|---|
| Optical compensation film 12 | Drawn | 37 | 1 | Invention |
| Optical compensation film 13 | " | 31 | 1 | " |
| Optical compensation film 14 | " | 30 | 1 | " |
| Optical compensation film 15 | " | 38 | 1 | " |
| Optical compensation film 16 | " | 32 | 1 | " |
| Optical compensation film 17 | " | 33 | 1 | " |
| Optical compensation film 18 | " | 34 | 1 | " |
| Optical compensation film 19 | " | 35 | 1 | " |
| Optical compensation film 20 | " | 36 | 1 | " |
| Optical compensation film 21 | " | 26 | 12 | Comp. Ex. |
| Optical compensation film 22 | " | 27 | 11 | " |

Furthermore, with regard to the cellulose acylate film of the present invention, a low reflection film was prepared using a drawn or undrawn cellulose acylate film of the present invention in accordance with Example 47 of 'Hatsumei Kyokai Koukai Giho' (Journal of Technical Disclosure) (Technical Disclosure No. 2001-1745, Japan Institute of Invention and Innovation), and excellent optical performance was obtained.

Example 9

In accordance with Example 1 of JP-A-2003-238688, a substrate film was prepared, and evaluation thereof was carried out in the same manner as in Example 5 of the present invention. It was found that the change in Re with humidity was 20, and the change in Rth with variation in humidity was 60. Compared with Example 5 of the present invention, it was found that the film of the present invention had a low humidity dependence of Re and Rth.

Example 10

Synthesis of Cellulose Derivative 60.4 g of cellulose acetate (398-30; degree of acetyl substitution 2.45, manufactured by Eastman Chemical) was dissolved in 570 g of distilled tetrahydrofuran, and 5.36 g of 3-isocyanatopropyltriethoxysilane and 410 mg of dibutyltin dilaurate were added under a flow of nitrogen, and stirred at 60° C. for 6 hours. The mixture was cooled to room temperature, then reprecipitated and washed with diethyl ether, and vacuum dried at room temperature for 24 hours. From measurement by $^1$H-NMR, the cellulose derivative obtained had an —OC=ONH(CH$_2$)$_3$Si(OC$_2$H$_5$)$_3$ group at a degree of substitution of 0.3.

Example 11

1. Formation of Cellulose Derivative Films (1) Preparation of Cellulose Acylate

Cellulose derivatives having the different types of substituent and degrees of substitution shown in Table 7 were prepared in the same manner as in Example 10.

(2) Dissolution of Cellulose Acylate (a) Solvent

Selected from the solvents below as shown in Table 7.

Non-chlorinated: methyl acetate/acetone/methanol/ethanol/butanol (80/5/7/5/3 parts by weight)

Chlorinated: dichloromethane/methanol/ethanol/butanol (85/6/5/4 parts by weight)

With regard to (b) cellulose derivative dope composition, (c) additive, and (d) swelling and dissolution, the procedures of (b) to (d) of (2) of Example 1 were repeated except that the cellulose derivatives shown in Table 7 were used. (5) Addition of reactive metal compound, water, and catalyst A reactive metal compound, water, and a catalyst were added to the above-mentioned cellulose derivative dope composition, and stirred at 40° C. for 4 hours. The type and amount are shown in Table 7. The amounts of reactive metal compound added (wt %) shown in the table are all proportions relative to the cellulose derivative. The amounts of water and catalyst added shown in the table are equivalents relative to the alkoxy group of the reactive metal compound.

A) Reactive Metal Compound

A-1 Tetraethoxysilane

A-2 Methyltrimethoxysilane

A-3 Phenyltrimethoxysilane

B) Catalyst
B-1 (Ethyl acetoacetato) aluminum diisopropoxide (6) Filtration and Concentration Filtration was subsequently carried out with a filter paper having an absolute filtration accuracy of 0.01 mm (#63; manufactured by Toyo Roshi Kaisha, Ltd.), and further with a filter paper having an absolute filtration accuracy of 2.5 μm (FH025; manufactured by Pall Corp.).

(3) Formation of Undrawn Film

The above-mentioned dope was heated at 35° C. and cast by the band method described in (3) (a) of Example 1.

With regard to these films, changes in Re and Rth accompanying environmental change between 25° C./10% RH and 25° C./80% RH were measured by the above-mentioned method, and are given in Table 7.

TABLE 7

| Sample No. | Degree of substitution by A[1] | Substituent of B[2] | Degree of substitution by B | Substituent of C[3] | Degree of substitution by C | Solvent |
|---|---|---|---|---|---|---|
| 47 | 1.75 | None | 0 | $(C_2H_5O)_3Si(CH_2)_3NHCO-$ | 0.3 | Chlorinated |
| 48 | 1.75 | None | 0 | $(C_2H_5O)_3Si(CH_2)_3NHCO-$ | 0.15 | Chlorinated |
| 49 | 2.6 | None | 0 | $(C_2H_5O)_3Si(CH_2)_3NHCO-$ | 0.15 | Chlorinated |
| 50 | 2.1 | $C_3H_7CO$ | 0.5 | None | 0 | Chlorinated |
| 51 | 2.45 | None | 0 | $(C_2H_5O)_3Si(CH_2)_3NHCO-$ | 0.3 | Chlorinated |
| 52 | 2.7 | None | 0 | $(C_2H_5O)_3Si(CH_2)_3NHCO-$ | 0.15 | Chlorinated |
| 53 | 2.2 | $C_3H_7CO$ | 0.5 | $(C_2H_5O)_3Si(CH_2)_3NHCO-$ | 0.15 | Chlorinated |
| 54 | 2.2 | $C_4H_9CO$ | 0.5 | $(C_2H_5O)_3Si(CH_2)_3NHCO-$ | 0.15 | Chlorinated |
| 55 | 1.95 | $C_4H_9CO$ | 0.85 | $(C_2H_5O)_3Si(CH_2)_3NHCO-$ | 0.05 | Chlorinated |
| 56 | 1.7 | $C_4H_9CO$ | 1.1 | $(C_2H_5O)_3Si(CH_2)_3NHCO-$ | 0.05 | Chlorinated |
| 57 | 1.1 | $C_4H_9CO$ | 1.72 | $(C_2H_5O)_3Si(CH_2)_3NHCO-$ | 0.05 | Chlorinated |
| 58 | 2.6 | $C_3H_7CO$ | 0.21 | $(C_2H_5O)_3Si(CH_2)_3NHCO-$ | 0.05 | Chlorinated |
| 59 | 2.6 | $C_4H_9CO$ | 0.21 | $(C_2H_5O)_3Si(CH_2)_3NHCO-$ | 0.05 | Chlorinated |
| 60 | 2.83 | None | 0 | $(C_2H_5O)_3Si(CH_2)_3NHCO-$ | 0.05 | Chlorinated |
| 61 | 2.7 | None | 0 | $(C_2H_5O)_3Si(CH_2)_2CO-$ | 0.15 | Chlorinated |
| 62 | 2.2 | $C_3H_7CO$ | 0.5 | $(C_2H_5O)_3Si(CH_2)_2CO-$ | 0.15 | Chlorinated |
| 63 | 2.2 | $C_4H_9CO$ | 0.5 | $(C_2H_5O)_3Si(CH_2)_2CO-$ | 0.05 | Chlorinated |
| 64 | 1.95 | $C_4H_9CO$ | 0.85 | $(C_2H_5O)_3Si(CH_2)_2CO-$ | 0.05 | Chlorinated |
| 65 | 1.7 | $C_4H_9CO$ | 1.1 | $(C_2H_5O)_3Si(CH_2)_2CO-$ | 0.05 | Non-chlorinated |
| 66 | 2.2 | $C_4H_9CO$ | 0.6 | $(C_2H_5O)_3Si(1,4-C_6H_4)CO-$ | 0.05 | Chlorinated |
| 67 | 1.95 | $C_4H_9CO$ | 0.85 | $(C_2H_5O)_3Si(1,4-C_6H_4)CO-$ | 0.05 | Chlorinated |
| 68 | 2.7 | None | 0 | $(C_2H_5O)_3Si(CH_2)_4NHCO-$ | 0.15 | Chlorinated |
| 69 | 2.2 | $C_3H_7CO$ | 0.5 | $(C_2H_5O)_3Si(CH_2)_4NHCO-$ | 0.15 | Non-Chlorinated |

| Sample No. | Metal compound | Amount added % | Amount of water added (equivalents) | Catalyst | Re (nm) | Rth (nm) | Change with humidity Re (nm) | Change with humidity Rth (nm) | Notes |
|---|---|---|---|---|---|---|---|---|---|
| 47 | A-1 | 15.85% | 1.2 | B-1 1% | 4 | 40 | 36 | 75 | Comp. Ex. |
| 48 | A-1 | 15.85% | 1.2 | B-1 1% | 5 | 50 | 32 | 91 | Comp. Ex. |
| 49 | None | None | None | None | 2 | 42 | 24 | 72 | Comp. Ex. |
| 50 | A-1 | 15.85% | 1.2 | B-1 1% | 5 | 38 | 27 | 87 | Comp. Ex. |
| 51 | A-1 | 15.85% | 1.2 | B-1 1% | 1 | 32 | 12 | 31 | Invention |
| 52 | A-1 | 15.85% | 1.2 | B-1 1% | 2 | 40 | 14 | 23 | Invention |
| 53 | A-2 | 18.93% | 1.2 | B-1 1% | 4 | 39 | 16 | 24 | Invention |
| 54 | A-3 | 11.00% | 1.2 | B-1 1% | 3 | 20 | 17 | 31 | Invention |
| 55 | A-2 | 14.53% | 1.2 | B-1 1% | 2 | 21 | 12 | 24 | Invention |
| 56 | A-3 | 10.67% | 1.2 | B-1 1% | 3 | 18 | 14 | 21 | Invention |
| 57 | A-1 | 14.13% | 1.2 | B-1 1% | 3 | 18 | 17 | 17 | Invention |
| 58 | A-1 | 23.13% | 1.1 | B-1 1% | 2 | 21 | 11 | 21 | Invention |
| 59 | A-2 | 15.13% | 1 | B-1 1% | 1 | 17 | 13 | 19 | Invention |
| 60 | A-1 | 11.73% | 1 | B-1 1% | 3 | 40 | 12 | 26 | Invention |
| 61 | A-2 | 18.93% | 1.1 | B-1 1% | 4 | 38 | 17 | 28 | Invention |
| 62 | A-1 | 11.73% | 1.2 | B-1 1% | 2 | 24 | 13 | 19 | Invention |
| 63 | A-2 | 18.93% | 1.05 | B-1 1% | 2 | 26 | 11 | 17 | Invention |
| 64 | A-1 | 11.73% | 1.05 | B-1 1% | 1 | 21 | 13 | 13 | Invention |
| 65 | A-2 | 18.93% | 1.05 | B-1 1% | 2 | 19 | 12 | 11 | Invention |
| 66 | A-1 | 11.73% | 1.1 | B-1 1% | 3 | 19 | 11 | 13 | Invention |
| 67 | A-2 | 18.93% | 1.1 | B-1 1% | 3 | 20 | 18 | 12 | Invention |
| 68 | A-3 | 11.00% | 1.1 | B-1 1% | 3 | 37 | 11 | 27 | Invention |
| 69 | A-3 | 14.53% | 1.2 | B-1 1% | 2 | 31 | 11 | 19 | Invention |

[1] A: Acetyl,
[2] B: Acyl groups other than acetyl,
[3] C: Group represented by Formula (1) Formula (1) $-(L^1)_m(L^2)SiR_nQ_{3-n}$ Films of Sample Nos. 47 and 48 formed from a cellulose derivative having a degree of substitution of less than 2.5, which falls outside the scope of the present invention, a film of Sample No. 49, which had a degree of substitution of 2.5 or greater but was not combined with a reactive metal compound of the present invention 2.5, and a film of Sample No. 50, which was combined with the reactive metal compound but had no substituent represented by Formula (1), all exhibited a large change in retardation with humidity for both Re and Rth and failed to give good optical films.

On the other hand, a film of the present invention formed by the combination of a cellulose derivative substituted as defined in the present invention and a reactive metal compound of the present invention exhibited excellent characteristics.

Example 12

20% MD drawing and 50% TD drawing were carried out in an undried state during film formation (immediately after completion of gradual heating subsequent to releasing). After carrying out the drawing, drying was carried out to give a drawn film, and the film was evaluated in the same manner as in Example 10, and the film of the present invention exhibited excellent characteristics.

Example 13

Formation and Evaluation of Characteristics of Polarizing Plates

The cellulose derivative films of Example 11 were subjected to saponification by the method described in Example 3 (1) (a) coating and saponification, polarizing plates were prepared by the same method as in (2) and (3) of Example 3, and the characteristics thereof were evaluated. The evaluation results are given in Table 8.

Those to which the present invention was applied exhibited excellent performance.

A polarizing plate that was drawn in accordance with Example 1 of JP-A-2002-86554 using a tenter so that the inclination of the drawing axis was 45 degrees was also prepared using a cellulose derivative film of the present invention, and the same good results as above were obtained.

TABLE 8

| | Sample | Color change | Display unevenness (%) | Notes |
|---|---|---|---|---|
| Polarizing plate 29 | 51 | 1 | 0 | Invention |
| Polarizing plate 30 | 52 | 1 | 0 | " |
| Polarizing plate 31 | 51 | 1 | 0 | " |
| Polarizing plate 32 | 53 | 1 | 0 | " |
| Polarizing plate 33 | 54 | 1 | 1 | " |
| Polarizing plate 34 | 55 | 1 | 0 | " |
| Polarizing plate 35 | 56 | 1 | 0 | " |
| Polarizing plate 36 | 57 | 1 | 0 | " |
| Polarizing plate 37 | 58 | 2 | 1 | " |
| Polarizing plate 38 | 59 | 1 | 0 | " |
| Polarizing plate 39 | 47 | 7 | 25 | Comp. Ex. |
| Polarizing plate 40 | 48 | 9 | 33 | " |

Example 14

Formation and Evaluation of Optical Compensation Films

Optical compensation films were prepared by the same method as in Example 4 using a saponified drawn cellulose derivative film of the present invention, the change in contrast was evaluated visually, and those to which the present invention was applied exhibited excellent performance.

Furthermore, with regard to the cellulose acylate film of the present invention, a low reflection film was prepared using a drawn or undrawn cellulose derivative film of the present invention in accordance with Example 47 of 'Hatsumei Kyokai Koukai Goho' (Journal of Technical Disclosure) (Technical Disclosure No. 2001-1745, Japan Institute of Invention and Innovation), and excellent optical performance was achieved.

What is claimed is:

1. A cellulose acylate film comprising:
   a cellulose acylate that satisfies the degrees of substitution below; and
   a hydrolysis-condensation product of a hydrolyzable and polycondensable reactive metal compound $2.5 \leq A+B \leq 3.0$ $0 \leq A \leq 2.95$ wherein A denotes the degree of substitution by acetyl, and B denotes the total of the degrees of substitution by acyl groups other than acetyl.

2. The cellulose acylate film according to claim 1, wherein the cellulose acylate satisfies the degrees of substitution below $2.5 \leq A+B \leq 3.0$ $0.5 \leq A \leq 2.95$.

3. The cellulose acylate film according to claim 1, wherein the reactive metal compound is a compound comprising an element selected from silicon, aluminum, zirconium, titanium, and germanium.

4. The cellulose acylate film according to claim 1, wherein in the reactive metal compound, a compound comprising silicon has a molar proportion of at least 50% and up to 100%.

5. The cellulose acylate film according to claim 1, wherein an aluminum chelate compound or a titanium chelate compound is used as a catalyst for hydrolysis and condensation of the reactive metal compound.

6. The cellulose acylate film according to claim 1, wherein the in-plane retardation (Re) and the retardation in the thickness direction (Rth) satisfy the expressions described below $Rth \geq Re$ $200 \geq Re \geq 0$ $500 \geq Rth \geq 20$.

7. The cellulose acylate film according to claim 1, wherein the change in Re and Rth accompanying a change in environment between 25° C./10% RH and 25° C./80% RH is 0 nm or above but no greater than 40 nm.

8. A process for producing the cellulose acylate film according to claim 1, the process comprising:
   a step of preparing a solution comprising a) a cellulose acylate that satisfies the degrees of substitution $2.5 \leq A+B \leq 3.0$ and $0 \leq A \leq 2.95$ wherein A denotes the degree of substitution by acetyl, and B denotes the total of the degrees of substitution by acyl groups other than acetyl, b) an oligomeric hydrolysis-condensation product of a hydrolyzable and polycondensable reactive metal compound, and c) a solvent;
   a step of casting the solution on a support; and
   a step of forming a film by removing the solvent and drying.

9. A cellulose derivative dope composition comprising:
a) a cellulose derivative that satisfies the degrees of substitution below $$2.5 \leq X+Y+Z \leq 3.0$$

$$0 < X+Y < 3.0$$

$$0 < Z < 3.0$$

wherein X denotes the degree of substitution by acetyl, Y denotes the total of the degrees of substitution by acyl groups other than acetyl, and Z denotes the degree of substitution by a group represented by Formula (1) below $$-(L^1)_m(L^2)SiR_nQ_{3-n} \qquad (1)$$

wherein $L^1$ denotes a divalent connecting group that can form a bond with an oxygen atom originating from a cellulose hydroxyl group, $L^2$ denotes a divalent connecting group, R denotes an alkyl group, an aryl group, an alkenyl group, an alkynyl group, or a heterocyclic group, Q denotes a halogen atom, an alkoxy group, an aryloxy group, an alkenyloxy group, an alkynyloxy group, a heterocyclic oxy group, or an acyloxy group, m denotes 0 or 1, and n denotes 0, 1, or 2;

b) a hydrolyzable and polycondensable reactive metal compound;

c) a metal chelate compound and/or an organotransition metal compound for hydrolysis and polycondensation of the reactive metal compound; and d) a solvent.

10. The cellulose derivative dope composition according to claim 9, wherein in Formula (1), $L^1$ is —C=O— or —C=ONH— and $L^2$ denotes a group selected from the group consisting of an alkylene group, an arylene group, —O—, —S—, —SO—, —SO$_2$—, —CO—, —NR$^1$— (R$^1$ denotes an alkyl group, an aryl group, an alkenyl group, an alkynyl group, or a heterocyclic group) and a divalent heterocyclic group, or a composite substituent of a combination of the above.

11. The cellulose derivative dope composition according to claim 9, wherein the reactive metal compound b) is a compound containing an element selected from silicon, aluminum, zirconium, titanium, and germanium.

12. The cellulose derivative dope composition according to claim 9, wherein among reactive metals constituting the reactive metal compound b), the molar proportion of silicon is at least 50% and up to 100%.

13. The cellulose derivative dope composition according to claim 9, wherein the metal chelate compound for hydrolysis and polycondensation of the reactive metal compound c) is an aluminum chelate compound and/or a titanium chelate compound.

14. An optical film obtained by casting and drying the cellulose derivative dope composition according to claim 9.

15. The optical film according to claim 14, wherein the in-plane retardation (Re) and the retardation in the thickness direction (Rth) satisfy the expressions below $$Rth \geq Re$$

$$200 \geq Re \geq 0$$

$$500 \geq Rth \geq 20.$$

16. The optical film according to claim 14, wherein the change in Re and Rth accompanying a change in environment between 25° C./10% RH and 25° C./80% RH is 0 nm or above but no greater than 40 nm.

* * * * *